(12) United States Patent
Cote et al.

(10) Patent No.: US 8,247,142 B1
(45) Date of Patent: Aug. 21, 2012

(54) FLUORINATED STRUCTURED ORGANIC FILM COMPOSITIONS

(75) Inventors: Adrien P. Cote, Clarkson (CA); Matthew A. Heuft, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/173,948

(22) Filed: Jun. 30, 2011

(51) Int. Cl.
*C08G 18/06* (2006.01)
*C08G 73/02* (2006.01)

(52) U.S. Cl. ....... 430/56; 427/372.2; 427/384; 427/542; 428/192; 428/220; 428/332; 564/434

(58) Field of Classification Search ............... 264/176.1, 264/219; 428/411.1, 412; 528/176, 190, 528/193, 194, 271, 272
See application file for complete search history.

(56) References Cited

U.S. PATENT DOCUMENTS

| | | | |
|---|---|---|---|
| 2,324,550 A | 7/1943 | Wolfe |
| 3,430,418 A | 3/1969 | Wagner |
| 3,801,315 A | 4/1974 | Gundlach et al. |
| 4,078,927 A | 3/1978 | Amidon et al. |
| 4,081,274 A | 3/1978 | Horgan |
| 4,115,116 A | 9/1978 | Stolka et al. |
| 4,233,384 A | 11/1980 | Turner et al. |
| 4,257,699 A | 3/1981 | Lentz |
| 4,265,990 A | 5/1981 | Stolka et al. |
| 4,286,033 A | 8/1981 | Neyhart et al. |
| 4,291,110 A | 9/1981 | Lee |
| 4,299,897 A | 11/1981 | Stolka et al. |
| 4,304,829 A | 12/1981 | Limburg et al. |
| 4,306,008 A | 12/1981 | Pai et al. |
| 4,338,387 A | 7/1982 | Hewitt |
| 4,457,994 A | 7/1984 | Pai et al. |
| 4,464,450 A | 8/1984 | Teuscher |
| 4,493,550 A | 1/1985 | Takekida |
| 4,664,995 A | 5/1987 | Horgan et al. |
| 4,855,203 A | 8/1989 | Badesha et al. |
| 4,871,634 A | 10/1989 | Limburg et al. |
| 4,917,711 A | 4/1990 | Xie et al. |
| 4,921,769 A | 5/1990 | Yuh et al. |
| 4,921,773 A | 5/1990 | Melnyk et al. |
| 5,017,432 A | 5/1991 | Eddy et al. |
| 5,061,965 A | 10/1991 | Ferguson et al. |
| 5,110,693 A | 5/1992 | Friend et al. |
| 5,139,910 A | 8/1992 | Law et al. |
| 5,165,909 A | 11/1992 | Tennent et al. |
| 5,166,031 A | 11/1992 | Badesha et al. |
| 5,281,506 A | 1/1994 | Badesha et al. |
| 5,300,271 A | 4/1994 | Golden et al. |
| 5,366,772 A | 11/1994 | Badesha et al. |
| 5,368,913 A | 11/1994 | Ortega |
| 5,370,931 A | 12/1994 | Fratangelo et al. |
| 5,432,539 A | 7/1995 | Anderson |
| 5,455,136 A | 10/1995 | Yu et al. |
| 5,456,897 A | 10/1995 | Moy et al. |
| 5,500,200 A | 3/1996 | Mandeville et al. |
| 5,569,635 A | 10/1996 | Moy et al. |
| 5,658,702 A | 8/1997 | Nukada |
| 5,702,854 A | 12/1997 | Schank et al. |
| 5,707,916 A | 1/1998 | Snyder et al. |
| 5,853,906 A | 12/1998 | Hsieh |
| 5,877,110 A | 3/1999 | Snyder et al. |
| 5,976,744 A | 11/1999 | Fuller et al. |
| 6,002,907 A | 12/1999 | Berkes |
| 6,107,117 A | 8/2000 | Bao et al. |
| 6,107,439 A | 8/2000 | Yanus et al. |
| 6,340,382 B1 | 1/2002 | Baksh et al. |
| 6,464,756 B1 | 10/2002 | Plee |
| 6,819,224 B2 | 11/2004 | Brierley |
| 7,067,687 B2 | 6/2006 | Pinnavaia et al. |
| 7,177,572 B2 | 2/2007 | DiRubio et al. |
| 7,196,210 B2 | 3/2007 | Yaghi et al. |
| 7,202,002 B2 | 4/2007 | Tokarski et al. |
| 7,384,717 B2 | 6/2008 | Dinh et al. |
| 7,416,824 B2 | 8/2008 | Kondoh et al. |
| 7,582,798 B2 | 9/2009 | Yaghi et al. |
| 2002/0098346 A1 | 7/2002 | Yitzchaik |
| 2003/0099845 A1 | 5/2003 | Ogawa et al. |
| 2003/0126989 A1 | 7/2003 | Bancon et al. |
| 2003/0172808 A1 | 9/2003 | Le Bec |
| 2005/0017633 A1 | 1/2005 | Miyadera |
| 2005/0257685 A1 | 11/2005 | Baksh et al. |
| 2005/0260443 A1 | 11/2005 | Marks et al. |
| 2006/0154807 A1 | 7/2006 | Yaghi et al. |
| 2006/0182993 A1 | 8/2006 | Ogata et al. |
| 2006/0204742 A1 | 9/2006 | Gronbeck et al. |
| 2006/0236862 A1 | 10/2006 | Golden et al. |
| 2007/0123606 A1 | 5/2007 | Toma et al. |
| 2008/0107980 A1 | 5/2008 | De Jong et al. |
| 2008/0132669 A1 | 6/2008 | Eriguchi et al. |
| 2008/0233343 A1 | 9/2008 | Cheng et al. |
| 2008/0268135 A1 | 10/2008 | Yokoyama et al. |
| 2008/0316247 A1 | 12/2008 | Cellura et al. |
| 2009/0046125 A1 | 2/2009 | Nystrom et al. |
| 2009/0053417 A1 | 2/2009 | Mino |
| 2011/0011128 A1 | 1/2011 | Grover |

(Continued)

FOREIGN PATENT DOCUMENTS

WO    WO 91/15813    10/1991

OTHER PUBLICATIONS

Shun Wan et al., "A Belt-Shaped, Blue Luminescent, and Semiconducting Covalent Organic Framework," Angew. Chem. Int. Ed., vol. 47, pp. 8826-8830 (published on web Jan. 10, 2008).

Nikolas A. A. Zwaneveld et al., "Organized Formation of 2D Extended Covalent Organic Frameworks at Surfaces," *J. Am. Chem. Soc.*, vol. 130, pp. 6678-6679 (published on web Apr. 30, 2008).

Adrien P. Cote et al., "Porous, Crystalline, Covalent Organic Frameworks," *Science*, vol. 310, pp. 1166-1170 (Nov. 18, 2005).

(Continued)

*Primary Examiner* — Terressa Boykin
(74) *Attorney, Agent, or Firm* — Oliff & Berridge, PLC

(57) ABSTRACT

A fluorinated structured organic film comprising a plurality of segments and a plurality of linkers arranged as a covalent organic framework, wherein the fluorine in the structured organic film may be distributed in a patterned uniform manner.

20 Claims, 5 Drawing Sheets

OTHER PUBLICATIONS

Hani El-Kaderi et al., "Designed Synthesis of 3D Covalent Organic Frameworks," *Science*, vol. 316, pp. 268-272 (Apr, 13, 2007).

Adrien P. Cote et al., "Reticular Synthesis of Microporous and Mesoporous Covalent Organic Frameworks" *J. Am. Chem. Soc.*, vol. 129, 12914-12915 (published on web Oct. 6, 2007).

Omar M. Yaghi et al., "Reticular synthesis and the design of new materials," *Nature*, vol. 423, pp. 705-714 (Jun. 12, 2003).

Nathan W. Ockwig et al., "Reticular Chemistry: Occurrence and Taxonomy of Nets and Grammar for the Design of Frameworks," *Acc. Chem, Res.*, vol. 38, No. 3, pp. 176-182 (published on web Jan. 19, 2005).

Pierre Kuhn et al., Porous, Covalent Triazine-Based Frameworks Prepared by Ionothermal Synthesis, *Angew. Chem. Int. Ed.*, vol. 47, pp. 3450-3453. (Published on web Mar. 10, 2008).

Jia-Xing Jiang at al., "Conjugated Microporous Poly(aryleneethylnylene) Networks," *Angew. Chem. Int. Ed.*, vol. 46, (2008) pp, 1-5 (Published on web Sep. 26, 2008).

Hunt, J.R. et al. "Reticular Synthesis of Covalent-Organic Borosilicate Frameworks" *J. Am. Chem. Soc.*, vol. 130, (2008), 11872-11873. (published on web Aug. 16, 2008).

Apr. 28, 2010 International Search Report issued in PCT/US 10/26082.

Apr. 28, 2010 Written Opinion issued in PCT/US 10/26082.

Apr. 27, 2010 International Search Report issued in PCT/US 10/26071.

Apr. 27, 2010 Written Opinion issued in PCT/US 10/26071.

Apr. 28, 2010 International Search Report issued in PCT/US 10/26091.

Apr. 28, 2010 Written Opinion issued in PCT/US 10/26091.

Apr. 28, 2010 International Search Report issued in PCT/US 10/26100.

Apr. 28, 2010 Written Opinion issued in PCT/US 10/26100.

Apr. 16, 2010 International Search Report issued in PCT/US 10/26079.

Apr. 16, 2010 Written Opinion issued in PCT/US 10/26079.

Apr. 20, 2010 International Search Report issued in PCT/US 10/26094.

Apr. 20, 2010 Written Opinion issued in PCT/US 10/26094.

U.S. Appl. No. 12/716,571, filed Mar. 3, 2010 Matthew A. Heuft et al.

U.S. Appl. No. 12/716,524, filed Mar. 3, 2010 Matthew A. Heuft et al.

U.S. Appl. No. 12/716,324, filed Mar. 3, 2010 Matthew A. Heuft et al.

U.S. Appl. No. 12/716,686, filed Mar. 3, 2010 Matthew A. Heuft et al.

U.S. Appl. No. 12/716,449, filed Mar. 3, 2010 Adrien Pierre Cote et al.

Cassie, A.B.D. et al., "Wettability of Porous Surfaces," Trans. Faraday Soc., vol. 40, pp. 546-551, Jun. 1944.

U.S. Appl. No. 12/854,962, filed Aug. 12, 2010 Matthew A. Heuft et al.

U.S. Appl. No. 12/815,688, filed Jun. 15, 2010 Adrien P. Cote et al.

U.S. Appl. No, 12/854,957, filed Aug. 12, 2010 Matthew A. Heuft et al.

U.S. Appl. No. 12/845,053, filed Jul. 28, 2010 Adrien P. Cote et al.

U.S. Appl. No. 12/845,235, filed Jul. 28, 2010 Adrien P. Cote et al.

U.S. Appl. No. 12/566,568, filed Sep. 24, 2009 Eugene M. Chow et al.

U.S. Appl. No. 12/566,518, filed Sep. 24, 2009 Eugene M. Chow et al.

U.S. Appl. No. 12/716,706, filed Mar. 3, 2010 Adrien Pierre Cote et al.

U.S. Appl. No. 12/845,052, filed Jul. 28, 2010 Adrien Pierre Cote et al.

Colson et al. "Oriented 2D Covalent Organic Framework Thin Films on Single-Layer Graphene", *Science*, 332, 228-231 (2011).

K.S. Novoselov et al., "Electric Field Effect in Atomically Thin Carbon Films", *Science*, Oct. 22, 2004, pp. 666-669, vol. 306.

Stankovich et al., "Graphene-Based Composite Materials", *Nature*, Jul. 20, 2006, pp. 282-286, vol. 442.

U.S. Appl. No. 13/042,950, filed Mar. 8, 2011 Adrien Pierre Cote et al.

U.S. Appl. No. 13/181,761, filed Jul. 13, 2011 Adrien Pierre Cote et al.

U.S. Appl. No. 13/181,912, filed Jul. 13, 2011 Adrien Pierre Cote et al.

U.S. Appl. No. 13/174,046, filed Jun. 30, 2011 Matthew A. Heuft et al.

U.S. Appl. No. 13/182,047, filed Jul. 13, 2011 Adrien Pierre Cote et al.

Jun. 1, 2011 Office Action issued in U.S. Appl. No. 12/716,524.

IDEAL ROD BUILDING BLOCK

IDEAL ROD BUILDING BLOCK

DISTORTED ROD BUILDING BLOCK

DISTORTED ROD BUILDING BLOCK

IDEAL TRIANGULAR BUILDING BLOCK

IDEAL TRIANGULAR BUILDING BLOCK

DISTORTED TRIANGULAR BUILDING BLOCK

DISTORTED TRIANGULAR BUILDING BLOCK

IDEAL TETRAHEDRAL BUILDING BLOCK

IDEAL TETRAHEDRAL BUILDING BLOCK

DISTORTED TETRAHEDRAL BUILDING BLOCK

DISTORTED TETRAHEDRAL BUILDING BLOCK

IDEAL SQUARE BUILDING BLOCK

DISTORTED SQUARE/TETRAHEDRAL BUILDING BLOCK

DISTORTED SQUARE/TETRAHEDRAL BUILDING BLOCK

FLUORINATED STRUCTURED ORGANIC FILM COMPOSITIONS

CROSS-REFERENCE TO RELATED APPLICATIONS

This nonprovisional application is related to U.S. patent application Ser. No. 12/716,524, which issued as U.S. Pat. No. 8,093,347; Ser. Nos. 12/716,449; 12/716,706; 12/716,324; 12/716,686; 12/716,571; 12/815,688; 12/845,053; 12/845,235; 12/854,962, which issued as U.S. Pat. No. 8,119,315; Ser. No. 12/854,957, which issued as U.S. Pat. No. 8,119,314; Ser. Nos. 12/845,052; and 13/042,950 entitled "Structured Organic Films," "Structured Organic Films Having an Added Functionality," "Mixed Solvent Process for Preparing Structured Organic Films," "Composite Structured Organic Films," "Process For Preparing Structured Organic Films (SOFs) Via a Pre-SOF," "Electronic Devices Comprising Structured Organic Films," "Periodic Structured Organic Films," "Capped Structured Organic Film Compositions," "Imaging Members Comprising Capped Structured Organic Film Compositions," "Imaging Members for Ink-Based Digital Printing Comprising Structured Organic Films," "Imaging Devices Comprising Structured Organic Films," "Imaging Members Comprising Structured Organic Films," "High Mobility Periodic Structured Organic Films," respectively; and U.S. Provisional Application No. 61/157,411, entitled "Structured Organic Films" filed Mar. 4, 2009, the disclosures of which are totally incorporated herein by reference in their entireties.

BACKGROUND OF THE INVENTION

Materials whose chemical structures are comprised of molecules linked by covalent bonds into extended structures may be placed into two classes: (1) polymers and cross-linked polymers, and (2) covalent organic frameworks (also known as covalently linked organic networks).

The first class, polymers and cross-linked polymers, is typically embodied by polymerization of molecular monomers to form long linear chains of covalently-bonded molecules. Polymer chemistry processes can allow for polymerized chains to, in turn, or concomitantly, become 'cross-linked.' The nature of polymer chemistry offers poor control over the molecular-level structure of the formed material, i.e. the organization of polymer chains and the patterning of molecular monomers between chains is mostly random.

Integrating fluorine content into polymers and cross-linked polymers opens opportunities for adapting/improving their utility. However, this is generally not a straightforward procedure: blending Teflon, Viton, or custom fluorinated polymers can be challenging due to their poor solubility with the nominal components of a film and may not result in evenly dispersed fluorine content. Integrating fluorinated small molecules is generally a more facile option; however achieving a stable dispersion (where the fluorine is evenly distributed) and the propensity for phase separation and leaching from the film are common road blocks toward implementation.

The second class, covalent organic frameworks (COFs), differ from the first class (polymers/cross-linked polymers) in that COFs are intended to be highly patterned. In COF chemistry molecular components are called molecular building blocks rather than monomers. During COF synthesis molecular building blocks react to form two- or three-dimensional networks. Consequently, molecular building blocks are patterned throughout COF materials and molecular building blocks are linked to each other through strong covalent bonds.

COFs developed thus far are typically powders with high porosity and are materials with exceptionally low density. While these conventional COFs are useful, there is a need, addressed by embodiments of the present invention, for new film materials where fluorine can be readily integrated (e.g., chemically bonded) and evenly dispersed within their structures. The fluorinated SOFs of the present disclosure address these needs and allow for the fluorine content to be logically and easily adjusted.

SUMMARY OF THE DISCLOSURE

A fluorinated structured organic film (SOF) comprising a plurality of segments including at least a first segment type and a plurality of linkers including at least a first linker type arranged as a covalent organic framework (COF), wherein at least the first segment type contains fluorine; and a process for preparing a fluorinated structured organic film, comprising: (a) preparing a liquid-containing reaction mixture comprising: a plurality of molecular building blocks including at least a first segment type and a number of functional groups, wherein the first segment type contains fluorine (b) depositing the reaction mixture as a wet film; and (c) promoting change of the wet film to form a dry SOF.

BRIEF DESCRIPTION OF THE DRAWINGS

Other aspects of the present disclosure will become apparent as the following description proceeds and upon reference to the following figures which represent illustrative embodiments.

DETAILED DESCRIPTION

Figure 1A:
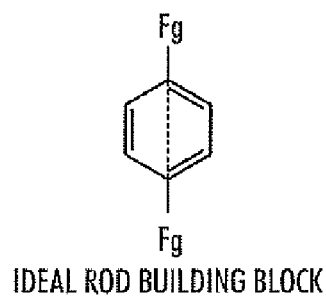
FIGS. 1A-O are illustrations of exemplary building blocks whose symmetrical elements are outlined.
Figure 1B:
Figure 1C:
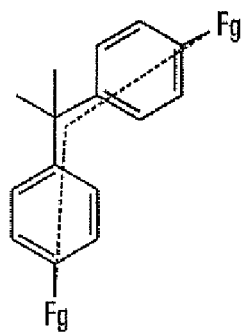
Figure 1D:
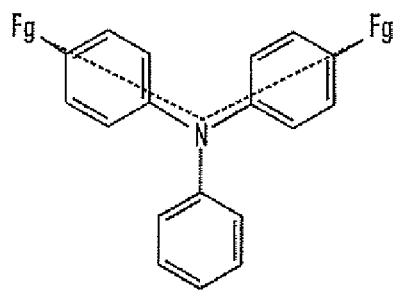
Figure 1E:
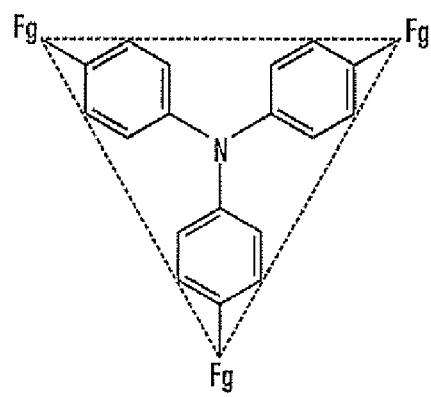
Figure 1F:
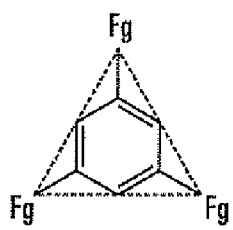
Figure 1G:
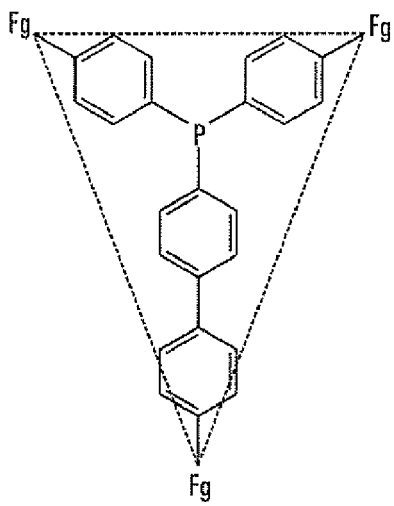
Figure 1H:
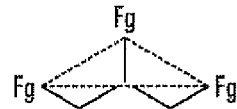
Figure 1I:
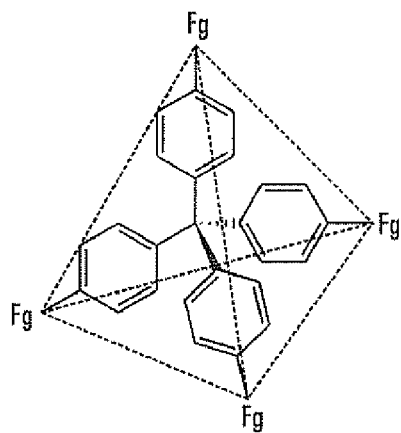
Figure 1J:
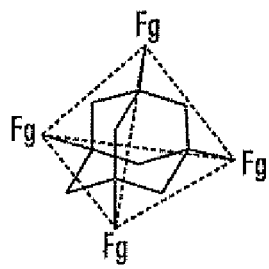
Figure 1K:
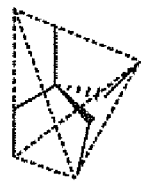
Figure 1L:
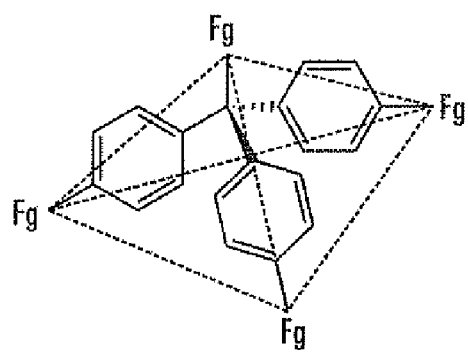
Figure 1M:
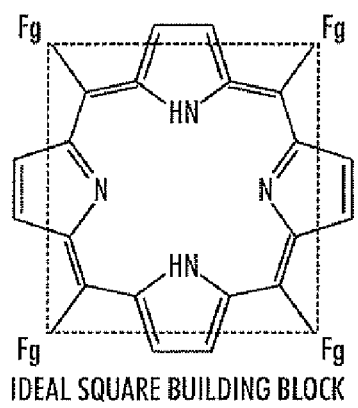
Figure 1N:
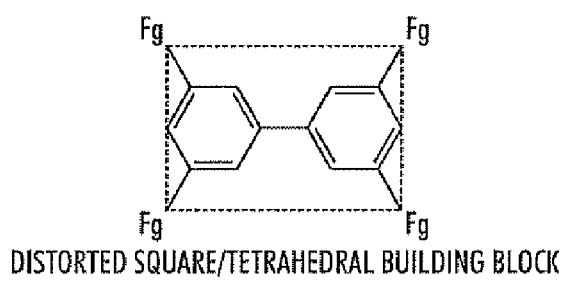

In this specification and the claims that follow, singular forms such as "a," "an," and "the" include plural forms unless the content clearly dictates otherwise.

The term "SOF" generally refers to a covalent organic framework (COF) that is a film at a macroscopic level. The phrase "macroscopic level" refers, for example, to the naked eye view of the present SOFs. Although COFs are a network at the "microscopic level" or "molecular level" (requiring use of powerful magnifying equipment or as assessed using scattering methods), the present SOF is fundamentally different at the "macroscopic level" because the film is for instance orders of magnitude larger in coverage than a microscopic level COF network. SOFs described herein that may be used in the embodiments described herein are solvent resistant and have macroscopic morphologies much different than typical COFs previously synthesized.

The term "fluorinated SOF" refers, for example, to a SOF that contains fluorine atoms covalently bonded to one or more segment types or linker types of the SOF. The fluorinated SOFs of the present disclosure may further comprise fluorinated molecules that are not covalently bound to the framework of the SOF, but are randomly distributed in the fluorinated SOF composition (i.e., a composite fluorinated SOP). However, an SOF, which does not contain fluorine atoms covalently bonded to one or more segment types or linker types of the SOF, that merely includes fluorinated molecules that are not covalently bonded to one or more segments or linkers of the SOF is a composite SOF, not a fluorinated SOF.

Designing and tuning the fluorine content in the SOF compositions of the present disclosure is straightforward and neither requires synthesis of custom polymers, nor requires blending/dispersion procedures. Furthermore, the SOF compositions of the present disclosure may be SOF compositions in which the fluorine content is uniformly dispersed and patterned at the molecular level. Fluorine content in the SOFs of the present disclosure may be adjusted by changing the molecular building block used for SOF synthesis or by changing the amount of fluorine building block employed.

In embodiments, the fluorinated SOF may be made by the reaction of one or more suitable molecular building blocks, where at least one of the molecular building block segments comprises fluorine atoms.

In embodiments, the fluorinated SOFs are highly networked compositions in which a first segment, which may or may not be obtained from the reaction of a fluorinated building block, may be linked to a second segment that is fluorinated, such as a second segment that has been obtained from the reaction of a fluorine-containing molecular building block.

In embodiments, the fluorine content of the fluorinated SOFs of the present disclosure may be homogeneously distributed throughout the SOF. The homogenous distribution of fluorine content in the SOF may be controlled by the SOF forming process and therefore the fluorine content may also be patterned at the molecular level.

In embodiments, the fluorine content of the fluorinated SOFs of the present disclosure may be homogeneously distributed throughout the SOF in a heterogeneous manner, including various patterns, wherein the concentration or density of the fluorine content is reduced in specific areas, such as to form a pattern of alternating bands of high and low concentrations of fluorine of a given width. Such patterning may be accomplished by utilizing a mixture of molecular building blocks sharing the same general parent molecular building block structure but differing in the degree of fluorination (i.e., the number of hydrogen atoms replaced with fluorine) of the building block.

In embodiments, the SOFs of the present disclosure may possess a heterogeneous distribution of the fluorine content, for example, by the application of highly fluorinated or perfluorinated molecular building block to the top of a formed wet layer, which may result in a higher portion of highly fluorinated or perfluorinated segments on a given side of the SOF and thereby forming a heterogeneous distribution highly fluorinated or perfluorinated segments within the thickness of the SOF, such that a linear or nonlinear concentration gradient may be obtained in the resulting SOF obtained after promotion of the change of the wet layer to a dry SOF. In such embodiments, a majority of the highly fluorinated or perfluorinated segments may end up in the upper half (which is opposite the substrate) of the dry SOF or a majority of the highly fluorinated or perfluorinated segments may end up in the lower half (which is adjacent to the substrate) of the dry SOF.

In embodiments, non-fluorinated molecular building blocks may be added to the top surface of a deposited wet layer, which upon promotion of a change in the wet film, results in an SOF having a heterogeneous distribution of the non-fluorinated segments in the dry SOF. In such embodiments, a majority of the non-fluorinated segments may end up in the upper half (which is opposite the substrate) of the dry SOF or a majority of the non-fluorinated segments may end up in the lower half (which is adjacent to the substrate) of the dry SOF.

In embodiments, the fluorine content in SOF materials may be easily altered by changing the fluorinated building block or the degree of fluorination of a given molecular building block. In embodiments, the fluorinated SOF compositions of the present disclosure may be hydrophobic, and may also be tailored to possess a second property (e.g. charge transport) to create films with hybrid properties.

In embodiments, the fluorinated SOF may be made by the reaction of one or more molecular building blocks, where at least one of the molecular building blocks contains fluorine. For example, the reaction of at least one, or two or more molecular building blocks of the same or different fluorine content may be undertaken to produce a fluorinated SOF. In specific embodiments, all of the molecular building blocks in the reaction mixture may contain fluorine. In embodiments, a different halogen, such as chlorine, and may optionally be contained in the molecular building blocks.

The fluorinated molecular building blocks may be derived from one or more building blocks containing a carbon or silicon atomic core; building blocks containing alkoxy cores; building blocks containing a nitrogen or phosphorous atomic core; building blocks containing aryl cores; building blocks containing carbonate cores; building blocks containing carbocyclic-, carbobicyclic-, or carbotricyclic core; and building blocks containing an oligothiophene core. Such fluorinated molecular building blocks may be derived by replacing or exchanging one or more hydrogen atoms with a fluorine atom. In embodiments, one or more one or more of the above molecular building blocks may have all the carbon bound hydrogen atoms replaced by fluorine. In embodiments, one or more one or more of the above molecular building blocks may have one or more hydrogen atoms replaced by a different halogen, such as by chlorine. In addition to fluorine, the SOFs of the present disclosure may also include other halogens, such as chlorine.

In embodiments, one or more fluorinated molecular building blocks may be respectively present individually or totally in the fluorinated SOF at a percentage of about 5 to about 100% by weight, such as at least about 50% by weight, or at least about 75% by weight, in relation to 100 parts by weight of the SOF.

In embodiments, the fluorinated SOF may have greater than about 20% of the H atoms replaced by fluorine atoms, such as greater than about 50%, greater than about 75%, greater than about 80%, greater than about 90%, or greater than about 95% of the H atoms replaced by fluorine atoms, or about 100% of the H atoms replaced by fluorine atoms.

In embodiments, the fluorinated SOF may have greater than about 20%, greater than about 50%, greater than about 75%, greater than about 80%, greater than about 90%, greater than about 95%, or about 100% of the C-bound H atoms replaced by fluorine atoms.

In embodiments, a significant hydrogen content may also be present, e.g. as carbon-bound hydrogen, in the SOFs of the present disclosure. In embodiments, in relation to the sum of the C-bound hydrogen and C-bound fluorine atoms, the percentage of the hydrogen atoms may be tailored to any desired amount. For example the ratio of C-bound hydrogen to C-bound fluorine may be less than about 10, such as a ratio of C-bound hydrogen to C-bound fluorine of less than about 5, or a ratio of C-bound hydrogen to C-bound fluorine of less than about 1, or a ratio of C-bound hydrogen to C-bound fluorine of less than about 0.1, or a ratio of C-bound hydrogen to C-bound fluorine of less than about 0.01.

In embodiments, the fluorine content of the fluorinated SOF may be of from about 5% to about 75% by weight, such as about 5% to about 65% by weight, or about 10% to about 50% by weight. In embodiments, the fluorine content of the fluorinated SOF is not less than about 10% by weight, such as not less than about 40% by weight, or not less than about 50% by weight, and an upper limit of the fluorine content is about 75% by weight, or about 60% by weight.

In embodiments, any desired amount of the segments in the SOF may be fluorinated. For example, the percent of fluorine containing segments may be greater than about 10% by weight, such as greater than about 30% by weight, or greater than 50% by weight; and an upper limit percent of fluorine containing segments may be 100%, such as less than about 90% by weight, or less than about 70% by weight.

In embodiments, the fluorinated SOF disclosed herein may be a "solvent resistant" SOF, a capped SOF, a composite SOF, and/or a periodic SOF. The term "solvent resistant" refers, for example, to the substantial absence of (1) any leaching out any atoms and/or molecules that were at one time covalently bonded to the SOF and/or SOF composition (such as a composite SOF), and/or (2) any phase separation of any molecules that were at one time part of the SOF and/or SOF composition (such as a composite SOF), that increases the susceptibility of the layer into which the SOF is incorporated to solvent/stress cracking or degradation. The term "substantial absence" refers for example, to less than about 0.5% of the atoms and/or molecules of the SOF being leached out after continuously exposing or immersing the SOF comprising imaging member (or SOF imaging member layer) to a solvent (such as, for example, either an aqueous fluid, or organic fluid) for a period of about 24 hours or longer (such as about 48 hours, or about 72 hours), such as less than about 0.1% of the atoms and/or molecules of the SOF being leached out after exposing or immersing the SOF comprising to a solvent for a period of about 24 hours or longer (such as about 48 hours, or about 72 hours), or less than about 0.01% of the atoms and/or molecules of the SOF being leached out after exposing or immersing the SOF to a solvent for a period of about 24 hours or longer (such as about 48 hours, or about 72 hours).

The term "organic fluid" refers, for example, to organic liquids or solvents, which may include, for example, alkenes, such as, for example, straight chain aliphatic hydrocarbons, branched chain aliphatic hydrocarbons, and the like, such as where the straight or branched chain aliphatic hydrocarbons have from about 1 to about 30 carbon atoms, such as from about 4 to about 20 carbons; aromatics, such as, for example, toluene, xylenes (such as o-, m-, p-xylene), and the like and/or mixtures thereof; isopar solvents or isoparaffinic hydrocarbons, such as a non-polar liquid of the ISOPAR™ series, such as ISOPAR E, ISOPAR G, ISOPAR H, ISOPAR L and ISO-PAR M (manufactured by the Exxon Corporation, these hydrocarbon liquids are considered narrow portions of iso-paraffinic hydrocarbon fractions), the NORPAR™ series of liquids, which are compositions of n-paraffins available from Exxon Corporation, the SOLTROL™ series of liquids available from the Phillips Petroleum Company, and the SHELLSOL™ series of liquids available from the Shell Oil Company, or isoparaffinic hydrocarbon solvents having from about 10 to about 18 carbon atoms, and or mixtures thereof. In embodiments, the organic fluid may be a mixture of one or more solvents, i.e., a solvent system, if desired. In addition, more polar solvents may also be used, if desired. Examples of more polar solvents that may be used include halogenated and nonhalogenated solvents, such as tetrahydrofuran, trichloro- and tetrachloroethane, dichloromethane, chloroform, monochlorobenzene, acetone, methanol, ethanol, benzene, ethyl acetate, dimethylformamide, cyclohexanone, N-methyl acetamide and the like. The solvent may be composed of one, two, three or more different solvents and/or and other various mixtures of the above-mentioned solvents.

When a capping unit is introduced into the SOF, the SOF framework is locally 'interrupted' where the capping units are present. These SOF compositions are 'covalently doped' because a foreign molecule is bonded to the SOF framework when capping units are present. Capped SOF compositions may alter the properties of SOFs without changing constituent building blocks. For example, the mechanical and physical properties of the capped SOF where the SOF framework is interrupted may differ from that of an uncapped SOF. In embodiments, the capping unit may fluorinated which would result in a fluorinated SOF.

The SOFs of the present disclosure may be, at the macroscopic level, substantially pinhole-free SOFs or pinhole-free SOFs having continuous covalent organic frameworks that can extend over larger length scales such as for instance much greater than a millimeter to lengths such as a meter and, in theory, as much as hundreds of meters. It will also be appreciated that SOFs tend to have large aspect ratios where typically two dimensions of a SOF will be much larger than the third. SOFs have markedly fewer macroscopic edges and disconnected external surfaces than a collection of COF particles.

In embodiments, a "substantially pinhole-free SOF" or "pinhole-free SOF" may be formed from a reaction mixture deposited on the surface of an underlying substrate. The term "substantially pinhole-free SOF" refers, for example, to an SOF that may or may not be removed from the underlying substrate on which it was formed and contains substantially no pinholes, pores or gaps greater than the distance between the cores of two adjacent segments per square cm; such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free SOF" refers, for example, to an SOF that may or may not be removed from the underlying substrate on which it was formed and contains no pinholes, pores or gaps greater than the distance between the cores of two adjacent segments per $micron^2$, such as no pinholes, pores or gaps greater than about 500 Angstroms in diameter per $micron^2$, or no pinholes, pores or gaps greater than about 250 Angstroms in diameter per $micron^2$, or no pinholes, pores or gaps greater than about 100 Angstroms in diameter per $micron^2$.

A description of various exemplary molecular building blocks, linkers, SOF types, capping groups, strategies to synthesize a specific SOF type with exemplary chemical structures, building blocks whose symmetrical elements are outlined, and classes of exemplary molecular entities and examples of members of each class that may serve as molecular building blocks for SOFs are detailed in U.S. patent application Ser. Nos. 12/716,524; 12/716,449; 12/716,706; 12/716,324; 12/716,686; 12/716,571; 12/815,688; 12/845,053; 12/845,235; 12/854,962; 12/854,957; and 12/845,052 entitled "Structured Organic Films," "Structured Organic Films Having an Added Functionality," "Mixed Solvent Process for Preparing Structured Organic Films," "Composite Structured Organic Films," "Process For Preparing Structured Organic Films (SOFs) Via a Pre-SOF," "Electronic Devices Comprising Structured Organic Films," "Periodic Structured Organic Films," "Capped Structured Organic Film Compositions," "Imaging Members Comprising Capped Structured Organic Film Compositions," "Imaging Members for Ink-Based Digital Printing Comprising Structured Organic Films," "Imaging Devices Comprising Structured Organic Films," and "Imaging Members Comprising Structured Organic Films," respectively; and U.S. Provisional Application No. 61/157,411, entitled "Structured Organic Films" filed Mar. 4, 2009, the disclosures of which are totally incorporated herein by reference in their entireties.

In embodiments, fluorinated molecular building blocks may be obtained from the fluorination of any of the above "parent" non-fluorinated molecular building blocks (e.g., molecular building blocks detailed in U.S. patent application Ser. Nos. 12/716,524; 12/716,449; 12/716,706; 12/716,324; 12/716,686; 12/716,571; 12/815,688; 12/845,053; 12/845,235; 12/854,962; 12/854,957; and 12/845,052, previously incorporated by reference) by known processes. For example, "parent" non-fluorinated molecular building blocks may be fluorinated via elemental fluorine at elevated temperatures, such as greater than about 150° C., or by other known process steps to form a mixture of fluorinated molecular building blocks having varying degrees of fluorination, which may be optionally purified to obtain an individual fluorinated molecular building block. Alternatively, fluorinated molecular building blocks may be synthesized and/or obtained by simple purchase of the desired fluorinated molecular building block. The conversion of a "parent" non-fluorinated molecular building block into a fluorinated molecular building block may take place under reaction conditions that utilize a single set or range of known reaction conditions, and may be a known one step reaction or known multi-step reaction. Exemplary reactions may include one or more known reaction mechanisms, such as an addition and/or an exchange.

For example, the conversion of a parent non-fluorinated molecular building block into a fluorinated molecular building block may comprise contacting a non-fluorinated molecular building block with a known dehydrohalogenation agent to produce a fluorinated molecular building block. In embodiments, the dehydrohalogenation step may be carried out under conditions effective to provide a conversion to replace at least about 50% of the H atoms, such as carbon-bound hydrogens, by fluorine atoms, such as greater than about 60%, greater than about 75%, greater than about 80%, greater than about 90%, or greater than about 95% of the H atoms, such as carbon-bound hydrogens, replaced by fluorine atoms, or about 100% of the H atoms replaced by fluorine atoms, in non-fluorinated molecular building block with fluorine. In embodiments, the dehydrohalogenation step may be carried out under conditions effective to provide a conversion that replaces at least about 99% of the hydrogens, such as carbon-bound hydrogens, in non-fluorinated molecular building block with fluorine. Such a reaction may be carried out in the liquid phase or in the gas phase, or in a combination of gas and liquid phases, and it is contemplated that the reaction can be carried out batch wise, continuous, or a combination of these. Such a reaction may be carried out in the presence of catalyst, such as activated carbon. Other catalysts may be used, either alone or in conjunction one another or depending on the requirements of particular molecular building block being fluorinated, including for example palladium-based catalyst, platinum-based catalysts, rhodium-based catalysts and ruthenium-based catalysts.

Molecular Building Block

The SOFs of the present disclosure comprise molecular building blocks having a segment (S) and functional groups (Fg). Molecular building blocks require at least two functional groups ($x \geq 2$) and may comprise a single type or two or more types of functional groups. Functional groups are the reactive chemical moieties of molecular building blocks that participate in a chemical reaction to link together segments during the SOF forming process. A segment is the portion of the molecular building block that supports functional groups and comprises all atoms that are not associated with functional groups. Further, the composition of a molecular building block segment remains unchanged after SOF formation.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

Figure 1O:
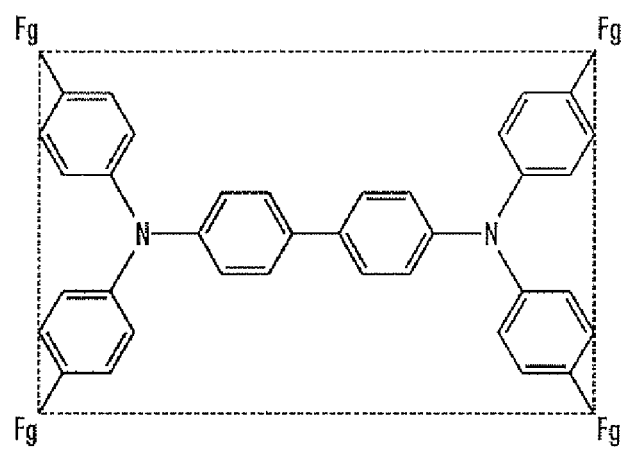

FIGS. 1A-O illustrate exemplary building blocks whose symmetrical elements are outlined. Such symmetrical elements are found in building blocks that may be used in the present disclosure. Such exemplary building blocks may or may not be fluorinated.

Non-limiting examples of various classes of exemplary molecular entities, which may or may not be fluorinated, that may serve as molecular building blocks for SOFs of the present disclosure include building blocks containing a carbon or silicon atomic core; building blocks containing alkoxy cores; building blocks containing a nitrogen or phosphorous atomic core; building blocks containing aryl cores; building blocks containing carbonate cores; building blocks containing carbocyclic-, carbobicyclic-, or carbotricyclic core; and building blocks containing an oligothiophene core.

In embodiments, exemplary fluorinated molecular building blocks may be obtained from the fluorination building blocks containing a carbon or silicon atomic core; building blocks containing alkoxy cores; building blocks containing a nitrogen or phosphorous atomic core; building blocks containing aryl cores; building blocks containing carbonate cores; building blocks containing carbocyclic-, carbobicyclic-, or carbotricyclic core; and building blocks containing an oligothiophene core. Such fluorinated molecular building blocks may be obtained from the fluorination of a non-fluorinated molecular building block with elemental fluorine at elevated temperatures, such as greater than about 150° C., or by other known process steps, or by simple purchase of the desired fluorinated molecular building block.

In embodiments, the Type 1 SOF contains segments (which may be fluorinated), which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

In embodiments, Type 2 and 3 SOF contains at least one segment type (which may or may not be fluorinated), which are not located at the edges of the SOF, that are connected by linkers to at least three other segments (which may or may not be fluorinated). For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Functional Group

Functional groups are the reactive chemical moieties of molecular building blocks that participate in a chemical reaction to link together segments during the SOF forming process. Functional groups may be composed of a single atom, or functional groups may be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, imines, ureas, aldehydes, isocyanates, tosylates, alkenes, alkynes and the like.

Molecular building blocks contain a plurality of chemical moieties, but only a subset of these chemical moieties are intended to be functional groups during the SOF forming process. Whether or not a chemical moiety is considered a functional group depends on the reaction conditions selected for the SOF forming process. Functional groups (Fg) denote a chemical moiety that is a reactive moiety, that is, a functional group during the SOF forming process.

In the SOF forming process, the composition of a functional group will be altered through the loss of atoms, the gain of atoms, or both the loss and the gain of atoms; or, the functional group may be lost altogether. In the SOF, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the SOF. Linker groups are described below.

Capping Unit

Capping units of the present disclosure are molecules that 'interrupt' the regular network of covalently bonded building blocks normally present in an SOF. Capped SOF compositions are tunable materials whose properties can be varied through the type and amount of capping unit introduced. Capping units may comprise a single type or two or more types of functional groups and/or chemical moieties.

In embodiments, the SOF comprises a plurality of segments, where all segments have an identical structure, and a plurality of linkers, which may or may not have an identical structure, wherein the segments that are not at the edges of the SOF are connected by linkers to at least three other segments and/or capping groups. In embodiments, the SOF comprises a plurality of segments where the plurality of segments comprises at least a first and a second segment that are different in structure, and the first segment is connected by linkers to at least three other segments and/or capping groups when it is not at the edge of the SOF.

In embodiments, the SOF comprises a plurality of linkers including at least a first and a second linker that are different in structure, and the plurality of segments either comprises at least a first and a second segment that are different in structure, where the first segment, when not at the edge of the SOF, is connected to at least three other segments and/or capping groups, wherein at least one of the connections is via the first linker, and at least one of the connections is via the second linker; or comprises segments that all have an identical structure, and the segments that are not at the edges of the SOF are connected by linkers to at least three other segments and/or capping groups, wherein at least one of the connections is via the first linker, and at least one of the connections is via the second linker.

Segment

A segment is the portion of the molecular building block that supports functional groups and comprises all atoms that are not associated with functional groups. Further, the composition of a molecular building block segment remains unchanged after SOF formation. In embodiments, the SOF may contain a first segment having a structure the same as or different from a second segment. In other embodiments, the structures of the first and/or second segments may be the same as or different from a third segment, forth segment, fifth segment, etc. A segment is also the portion of the molecular building block that can provide an inclined property. Inclined properties are described later in the embodiments.

In specific embodiments, the segment of the SOF comprises at least one atom of an element that is not carbon, such at least one atom selected from the group consisting of hydrogen, oxygen, nitrogen, silicon, phosphorous, selenium, boron, and sulfur.

Linker

A linker is a chemical moiety that emerges in a SOF upon chemical reaction between functional groups present on the molecular building blocks and/or capping unit.

A linker may comprise a covalent bond, a single atom, or a group of covalently bonded atoms. The former is defined as a covalent bond linker and may be, for example, a single covalent bond or a double covalent bond and emerges when functional groups on all partnered building blocks are lost entirely. The latter linker type is defined as a chemical moiety linker and may comprise one or more atoms bonded together by single covalent bonds, double covalent bonds, or combinations of the two. Atoms contained in linking groups originate from atoms present in functional groups on molecular building blocks prior to the SOF forming process. Chemical moiety linkers may be well-known chemical groups such as, for example, esters, ketones, amides, imines, ethers, urethanes, carbonates, and the like, or derivatives thereof.

For example, when two hydroxyl (—OH) functional groups are used to connect segments in a SOF via an oxygen atom, the linker would be the oxygen atom, which may also be described as an ether linker. In embodiments, the SOF may contain a first linker having a structure the same as or different from a second linker. In other embodiments, the structures of the first and/or second linkers may be the same as or different from a third linker, etc.

Metrical Parameters of SOFs

SOFs have any suitable aspect ratio. In embodiments, SOFs have aspect ratios for instance greater than about 30:1 or greater than about 50:1, or greater than about 70:1, or greater than about 100:1, such as about 1000:1. The aspect ratio of a SOF is defined as the ratio of its average width or diameter (that is, the dimension next largest to its thickness) to its average thickness (that is, its shortest dimension). The term 'aspect ratio,' as used here, is not bound by theory. The longest dimension of a SOF is its length and it is not considered in the calculation of SOF aspect ratio.

Multilayer SOFs

A SOF may comprise a single layer or a plurality of layers (that is, two, three or more layers). SOFs that are comprised of a plurality of layers may be physically joined (e.g., dipole and hydrogen bond) or chemically joined. Physically attached layers are characterized by weaker interlayer interactions or adhesion; therefore physically attached layers may be susceptible to delamination from each other. Chemically attached layers are expected to have chemical bonds (e.g., covalent or ionic bonds) or have numerous physical or intermolecular (supramolecular) entanglements that strongly link adjacent layers.

Therefore, delamination of chemically attached layers is much more difficult. Chemical attachments between layers may be detected using spectroscopic methods such as focusing infrared or Raman spectroscopy, or with other methods having spatial resolution that can detect chemical species precisely at interfaces. In cases where chemical attachments between layers are different chemical species than those within the layers themselves it is possible to detect these attachments with sensitive bulk analyses such as solid-state nuclear magnetic resonance spectroscopy or by using other bulk analytical methods.

In the embodiments, the fluorinated SOF may be a single layer (mono-segment thick or multi-segment thick) or multiple layers (each layer being mono-segment thick or multi-segment thick). "Thickness" refers, for example, to the smallest dimension of the film. As discussed above, in a SOF, segments are molecular units that are covalently bonded through linkers to generate the molecular framework of the film. The thickness of the film may also be defined in terms of the number of segments that is counted along that axis of the film when viewing the cross-section of the film. A "mono-layer" SOF is the simplest case and refers, for example, to where a film is one segment thick. A SOF where two or more segments exist along this axis is referred to as a "multi-segment" thick SOF.

An exemplary method for preparing a physically attached multilayer SOFs includes: (1) forming a base SOF layer that may be cured by a first curing cycle, and (2) forming upon the base layer a second reactive wet layer followed by a second curing cycle and, if desired, repeating the second step to form a third layer, a forth layer and so on. The physically stacked multilayer SOFs may have thicknesses greater than about 20 Angstroms such as, for example, the following illustrative thicknesses: about 20 Angstroms to about 10 cm, such as about 1 nm to about 10 mm, or about 0.1 mm Angstroms to about 5 mm. In principle there is no limit with this process to the number of layers that may be physically stacked.

In embodiments, a multilayer SOF may be formed by a method for preparing chemically attached multilayer SOFs by: (1) forming a base SOF layer having functional groups present on the surface (or dangling functional groups) from a first reactive wet layer, and (2) forming upon the base layer a second SOF layer from a second reactive wet layer that comprises molecular building blocks with functional groups capable of reacting with the dangling functional groups on the surface of the base SOF layer. In further embodiments, a capped SOF may serve as the base layer in which the functional groups present that were not suitable or complementary to participate in the specific chemical reaction to link together segments during the base layer SOF forming process may be available for reacting with the molecular building blocks of the second layer to from an chemically bonded multilayer SOF. If desired, the formation used to form the second SOF layer should comprise molecular building blocks with functional groups capable of reacting with the functional groups from the base layer as well as additional functional groups that will allow for a third layer to be chemically attached to the second layer. The chemically stacked multilayer SOFs may have thicknesses greater than about 20 Angstroms such as, for example, the following illustrative thicknesses: about 20 Angstroms to about 10 cm, such as about 1 nm to about 10 mm, or about 0.1 mm Angstroms to about 5 mm. In principle there is no limit with this process to the number of layers that may be chemically stacked.

In embodiments, the method for preparing chemically attached multilayer SOFs comprises promoting chemical attachment of a second SOF onto an existing SOF (base layer) by using a small excess of one molecular building block (when more than one molecular building block is present) during the process used to form the SOF (base layer) whereby the functional groups present on this molecular building block will be present on the base layer surface. The surface of base layer may be treated with an agent to enhance the reactivity of the functional groups or to create an increased number of functional groups.

In an embodiment the dangling functional groups or chemical moieties present on the surface of an SOF or capped SOF may be altered to increase the propensity for covalent attachment (or, alternatively, to disfavor covalent attachment) of particular classes of molecules or individual molecules, such as SOFs, to a base layer or any additional substrate or SOF layer. For example, the surface of a base layer, such as an SOF layer, which may contain reactive dangling functional groups, may be rendered pacified through surface treatment with a capping chemical group. For example, a SOF layer having dangling hydroxyl alcohol groups may be pacified by treatment with trimethylsiylchloride thereby capping hydroxyl groups as stable trimethylsilylethers. Alternatively, the surface of base layer may be treated with a non-chemically bonding agent, such as a wax, to block reaction with dangling functional groups from subsequent layers.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

In embodiments, a Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Practice of Linking Chemistry

In embodiments linking chemistry may occur wherein the reaction between functional groups produces a volatile byproduct that may be largely evaporated or expunged from the SOF during or after the film forming process or wherein no byproduct is formed. Linking chemistry may be selected to achieve a SOF for applications where the presence of linking chemistry byproducts is not desired. Linking chemistry reactions may include, for example, condensation, addition/elimination, and addition reactions, such as, for example, those that produce esters, imines, ethers, carbonates, urethanes, amides, acetals, and silyl ethers.

In embodiments the linking chemistry via a reaction between function groups producing a non-volatile byproduct that largely remains incorporated within the SOF after the film forming process. Linking chemistry in embodiments may be selected to achieve a SOF for applications where the presence of linking chemistry byproducts does not impact the properties or for applications where the presence of linking chemistry byproducts may alter the properties of a SOF (such as, for example, the electroactive, hydrophobic or hydrophilic nature of the SOF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an important aspect of the present disclosure. Reasons for controlling the rate and extent of reaction may include adapting the film forming process for different coating methods and tuning the microscopic arrangement of building blocks to achieve a periodic SOF, as defined in earlier embodiments.

Innate Properties of COFs

COFs have innate properties such as high thermal stability (typically higher than 400° C. under atmospheric conditions); poor solubility in organic solvents (chemical stability), and porosity (capable of reversible guest uptake). In embodiments, SOFs may also possess these innate properties.

Added Functionality of SOFs

Added functionality denotes a property that is not inherent to conventional COFs and may occur by the selection of molecular building blocks wherein the molecular compositions provide the added functionality in the resultant SOF. Added functionality may arise upon assembly of molecular building blocks having an "inclined property" for that added functionality. Added functionality may also arise upon assembly of molecular building blocks having no "inclined property" for that added functionality but the resulting SOF has the added functionality as a consequence of linking segments (S) and linkers into a SOF. Furthermore, emergence of added functionality may arise from the combined effect of using molecular building blocks bearing an "inclined property" for that added functionality whose inclined property is modified or enhanced upon linking together the segments and linkers into a SOF.

An Inclined Property of a Molecular Building Block

The term "inclined property" of a molecular building block refers, for example, to a property known to exist for certain molecular compositions or a property that is reasonably identifiable by a person skilled in art upon inspection of the molecular composition of a segment. As used herein, the terms "inclined property" and "added functionality" refer to the same general property (e.g., hydrophobic, electroactive, etc.) but "inclined property" is used in the context of the molecular building block and "added functionality" is used in the context of the SOF.

The hydrophobic (superhydrophobic), hydrophilic, lipophobic (superlipophobic), lipophilic, photochromic and/or electroactive (conductor, semiconductor, charge transport material) nature of an SOF are some examples of the properties that may represent an "added functionality" of an SOF. These and other added functionalities may arise from the inclined properties of the molecular building blocks or may arise from building blocks that do not have the respective added functionality that is observed in the SOF.

The term hydrophobic (superhydrophobic) refers, for example, to the property of repelling water, or other polar species, such as methanol, it also means an inability to absorb water and/or to swell as a result. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

Superhydrophobic as used herein can be described as when a droplet of water forms a sliding angle with a surface, such as a sliding angle of from about 1° to less than about 30°, or from about 1° to about 25°, or a sliding angle of less than about 15°, or a sliding angle of less than about 10°.

The term hydrophilic refers, for example, to the property of attracting, adsorbing, or absorbing water or other polar species, or a surface. Hydrophilicity may also be characterized by swelling of a material by water or other polar species, or a material that can diffuse or transport water, or other polar species, through itself. Hydrophilicity, is further characterized by being able to form strong or numerous hydrogen bonds to water or other hydrogen bonding species.

The term lipophobic (oleophobic) refers, for example, to the property of repelling oil or other non-polar species such as alkanes, fats, and waxes. Lipophobic materials are typically characterized by having oil contact angles greater than 90° as measured using a contact angle goniometer or related device. In the present disclosure, the term oleophobic refers, for example, to wettability of a surface that has an oil contact angle of approximately about 55° or greater, for example, with UV curable ink, solid ink, hexadecane, dodecane, hydrocarbons, etc. Highly oleophobic as used herein can be described as when a droplet of hydrocarbon-based liquid, for example, hexadecane or ink, forms a high contact angle with a surface, such as a contact angle of from about 130° or greater than about 130° to about 175° or from about 135° to about 170°. Superoleophobic as used herein can be described as when a droplet of hydrocarbon-based liquid, for example, ink, forms a high contact-angle with a surface, such as a contact angle that is greater than 150°, or from greater than about 150° to about 175', or from greater than about 150° to about 160°.

Superoleophobic as used herein can also be described as when a droplet of a hydrocarbon-based liquid, for example, hexadecane, forms a sliding angle with a surface of from about 1° to less than about 30°, or from about 1° to less than about 25°, or a sliding angle of less than about 25°, or a sliding angle of less than about 15°, or a sliding angle of less than about 10°.

The term lipophilic (oleophilic) refers, for example, to the property attracting oil or other non-polar species such as alkanes, fats, and waxes or a surface that is easily wetted by such species. Lipophilic materials are typically characterized by having a low to nil oil contact angle as measured using, for example, a contact angle goniometer. Lipophilicity can also be characterized by swelling of a material by hexane or other non-polar liquids.

Various methods a available for quantifying the wetting or contact angle. For example, the wetting can be measured as contact angle, which is formed by the substrate and the tangent to the surface of the liquid droplet at the contact point. Specifically, the contact angle may be measured using Fibro DAT1100. The contact angle determines the interaction between a liquid and a substrate. A drop of a specified volume of fluid may be automatically applied to the specimen surface using a micro-pipette. Images of the drop in contact with the substrate are captured by a video camera at specified time intervals. The contact angle between the drop and the substrate are determined by image analysis techniques on the images captured. The rate of change of the contact angles are calculated as a function of time.

The term photochromic refers, for example, to the ability to demonstrate reversible color changes when exposed to electromagnetic radiation. SOF compositions containing photochromic molecules may be prepared and demonstrate reversible color changes when exposed to electromagnetic radiation. These SOFs may have the added functionality of photochromism. The robustness of photochromic SOFs may enable their use in many applications, such as photochromic SOFs for erasable paper, and light responsive films for window tinting/shading and eye wear. SOF compositions may contain any suitable photochromic molecule, such as a difunctional photochromic molecules as SOF molecular building blocks (chemically bound into SOF structure), a monofunctional photochromic molecules as SOF capping units (chemically bound into SOF structure, or unfunctionalized photochromic molecules in an SOF composite (not chemically bound into SOF structure). Photochromic SOFs may change color upon exposure to selected wavelengths of light and the color change may be reversible.

SOF compositions containing photochromic molecules that chemically bond to the SOF structure are exceptionally chemically and mechanically robust photochromic materials. Such photochromic SOF materials demonstrate many superior properties, such as high number of reversible color change processes, to available polymeric alternatives.

The term electroactive refers, for example, to the property to transport electrical charge (electrons and/or holes). Electroactive materials include conductors, semiconductors, and charge transport materials. Conductors are defined as materials that readily transport electrical charge in the presence of a potential difference. Semiconductors are defined as materials do not inherently conduct charge but may become conductive in the presence of a potential difference and an applied stimuli, such as, for example, an electric field, electromagnetic radiation, heat, and the like. Charge transport materials are defined as materials that can transport charge when charge is injected from another material such as, for example, a dye, pigment, or metal in the presence of a potential difference.

Conductors may be further defined as materials that give a signal using a potentiometer from about 0.1 to about $10^7$ S/cm.

Semiconductors may be further defined as materials that give a signal using a potentiometer from about $10^{-6}$ to about $10^4$ S/cm in the presence of applied stimuli such as, for example an electric field, electromagnetic radiation, heat, and the like. Alternatively, semiconductors may be defined as materials having electron and/or hole mobility measured using time-of-flight techniques in the range of $10^{-10}$ to about $10^6$ cm$^2$V$^{-1}$ s$^{-1}$ when exposed to applied stimuli such as, for example an electric field, electromagnetic radiation, heat, and the like.

Charge transport materials may be further defined as materials that have electron and/or hole mobility measured using time-of-flight techniques in the range of $10^{10}$ to about $10^6$ cm$^2$V$^{-1}$ s$^{-1}$. It should be noted that under some circumstances charge transport materials may be also classified as semiconductors.

SOFs with hydrophobic added functionality may be prepared by using molecular building blocks with inclined hydrophobic properties and/or have a rough, textured, or porous surface on the sub-micron to micron scale. A paper describing materials having a rough, textured, or porous surface on the sub-micron to micron scale being hydrophobic was authored by Cassie and Baxter (Cassie, A. B. D.; Baxter, S. Trans. Faraday Soc., 1944, 40, 546).

Fluorine-containing polymers are known to have lower surface energies than the corresponding hydrocarbon polymers. For example, polytetrafluoroethylene (PTFE) has a lower surface energy than polyethylene (20 mN/m vs 35.3 mN/m). The introduction of fluorine into SOFs, particularly when fluorine is present at the surface of the film, may be used to modulate the surface energy of the SOF compared to the corresponding, non-fluorinated SOF. In most cases, introduction of fluorine into the SOF will lower the films surface energy. The extent the surface energy of the SOF is modulated, may, for example, depend on the degree of fluorination and/or the patterning of fluorine at the surface of the SOF and/or within the bulk of the SOF. The degree of fluorination and/or the patterning of fluorine at the surface of the SOF are parameters that may be tuned by the processes of the present disclosure.

Molecular building blocks comprising or bearing highly-fluorinated segments have inclined hydrophobic properties and may lead to SOFs with hydrophobic added functionality. Highly-fluorinated segments are defined as the number of fluorine atoms present on the segment(s) divided by the number of hydrogen atoms present on the segment(s) being greater than one. Fluorinated segments, which are not highly-fluorinated segments may also lead to SOFs with hydrophobic added functionality.

The fluorinated SOFs of the present disclosure may be made from versions of any of the molecular building blocks, segments, and/or linkers wherein one or more hydrogen(s) in the molecular building blocks are replaced with fluorine.

The above-mentioned fluorinated segments may include, for example, fluorinated alcohols of the general structure HOCH$_2$(CF$_2$)$_n$CH$_2$OH and their corresponding dicarboxylic acids and aldehydes, where n is an integer having a value of 1 or more, such as of from 1 to about 100, or 1 to about 60, or 2 to about 30; tetrafluorohydroquinone; perfluoroadipic acid hydrate, 4,4'-(hexafluoroisopropylidene)diphthalic anhydride; 4,4'-(hexafluoroisopropylidene)diphenol, and the like.

SOFs having a rough, textured, or porous surface on the sub-micron to micron scale may also be hydrophobic. The rough, textured, or porous SOF surface can result from dangling functional groups present on the film surface or from the structure of the SOF. The type of pattern and degree of patterning depends on the geometry of the molecular building blocks and the linking chemistry efficiency. The feature size that leads to surface roughness or texture is from about 100 nm to about 10 µm, such as from about 500 nm to about 5 µm.

SOFs with hydrophilic added functionality may be prepared by using molecular building blocks with inclined hydrophilic properties and/or comprising polar linking groups.

Molecular building blocks comprising segments bearing polar substituents have inclined hydrophilic properties and may lead to SOFs with hydrophilic added functionality. The term polar substituents refers, for example, to substituents that can form hydrogen bonds with water and include, for example, hydroxyl, amino, ammonium, and carbonyl (such as ketone, carboxylic acid, ester, amide, carbonate, urea).

SOFs with electroactive added functionality may be prepared by using molecular building blocks with inclined electroactive properties and/or be electroactive resulting from the assembly of conjugated segments and linkers. The following sections describe molecular building blocks with inclined hole transport properties, inclined electron transport properties, and inclined semiconductor properties.

Process for Preparing a Fluorinated Structured Organic Film

The process for making fluorinated SOFs of the present disclosure, such as solvent resistant fluorinated SOFs, typically comprises a number of activities or steps (set forth below) that may be performed in any suitable sequence or where two or more activities are performed simultaneously or in close proximity in time:

A process for preparing a structured organic film comprising:

(a) preparing a liquid-containing reaction mixture comprising a plurality of molecular building blocks, each comprising a segment (where at least one segment may comprise fluorine) and a number of functional groups, and a pre-SOF;

(b) depositing the reaction mixture as a wet film;

(c) promoting a change of the wet film including the molecular building blocks to a dry film comprising the SOF comprising a plurality of the segments and a plurality of linkers arranged as a covalent organic framework, wherein at a macroscopic level the covalent organic framework is a film;

(d) optionally removing the SOF from the substrate to obtain a free-standing SOF;

(e) optionally processing the free-standing SOF into a roll;

(f) optionally cutting and seaming the SOF into a belt; and (g) optionally performing the above SOF formation process(es) upon an SOF (which was prepared by the above SOF formation process(es)) as a substrate for subsequent SOF formation process(es).

The process for making capped SOFs and/or composite SOFs typically comprises a similar number of activities or steps (set forth above) that are used to make a non-capped SOF. The capping unit and/or secondary component may be added during either step a, b or c, depending the desired distribution of the capping unit in the resulting SOF. For example, if it is desired that the capping unit and/or secondary component distribution is substantially uniform over the resulting SOF, the capping unit may be added during step a. Alternatively, if, for example, a more heterogeneous distribution of the capping unit and/or secondary component is desired, adding the capping unit and/or secondary component (such as by spraying it on the film formed during step b or during the promotion step of step c) may occur during steps b and c.

The above activities or steps may be conducted at atmospheric, super atmospheric, or subatmospheric pressure. The term "atmospheric pressure" as used herein refers to a pressure of about 760 torr. The term "super atmospheric" refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed.

In embodiments, an advantage of the fluorinated SOF liquid-containing reaction mixtures is their homogeneity. In the art, fluorinated molecules can have poor solubility in solvents. The present disclosure includes fluorinated SOF liquid-containing reaction mixtures wherein molecular building blocks (such as fluorinated molecular building blocks) are readily solubilized, optionally using a pre-SOF step.

Process Action A: Preparation of the Liquid-Containing Reaction Mixture

The reaction mixture comprises a plurality of molecular building blocks that are dissolved, suspended, or mixed in a liquid. The plurality of molecular building blocks may be of one type or two or more types. When one or more of the molecular building blocks is a liquid, the use of an additional liquid is optional. Catalysts may optionally be added to the reaction mixture to enable pre-SOF formation and/or modify the kinetics of SOF formation during Action C described above. The teen "pre-SOF" may refer to, for example, at least two molecular building blocks that have reacted and have a molecular weight higher than the starting molecular building block and contain multiple functional groups capable of undergoing further reactions with functional groups of other building blocks or pre-SOFs to obtain a SOF, which may be a substantially defect-free or defect-free SOF, and/or the 'activation' of molecular building block functional groups that imparts enhanced or modified reactivity for the film forming process. Activation may include dissociation of a functional group moiety, pre-association with a catalyst, association with a solvent molecule, liquid, second solvent, second liquid, secondary component, or with any entity that modifies functional group reactivity. In embodiments, pre-SOF formation may include the reaction between molecular building blocks or the 'activation' of molecular building block functional groups, or a combination of the two. The formation of the "pre-SOF" may be achieved by in a number of ways, such as heating the reaction mixture, exposure of the reaction mixture to UV radiation, or any other means of partially reacting the molecular building blocks and/or activating functional groups in the reaction mixture prior to deposition of the wet layer on the substrate. Additives or secondary components may optionally be added to the reaction mixture to alter the physical properties of the resulting SOF.

The reaction mixture components (molecular building blocks, optionally a liquid, optionally catalysts, and optionally additives) are combined in a vessel. The order of addition of the reaction mixture components may vary; however, typically when a process for preparing a SOF includes a pre-SOF or formation of a pre-SOF, the catalyst, when present, may be added to the reaction mixture before depositing the reaction mixture as a wet film. In embodiments, the molecular building blocks may be reacted actinically, thermally, chemically or by any other means with or without the presence of a catalyst to obtain a pre-SOF. The pre-SOF and the molecular building blocks formed in the absence of catalyst may be may be heated in the liquid in the absence of the catalyst to aid the dissolution of the molecular building blocks and pre-SOFs. In embodiments, the pre-SOF and the molecular building blocks formed in the presence of catalyst may be may be heated at a temperature that does not cause significant further reaction of the molecular building blocks and/or the pre-SOFs to aid the dissolution of the molecular building blocks and pre-SOFs. The reaction mixture may also be mixed, stirred, milled, or the like, to ensure even distribution of the formulation components prior to depositing the reaction mixture as a wet film.

In embodiments, the reaction mixture may be heated prior to being deposited as a wet film. This may aid the dissolution of one or more of the molecular building blocks and/or increase the viscosity of the reaction mixture by the partial reaction of the reaction mixture prior to depositing the wet layer to faun pre-SOFs. For example, the weight percent of molecular building blocks in the reaction mixture that are incorporated into pre-reacted molecular building blocks pre-SOFs may be less than 20%, such as about 15% to about 1%, or 10% to about 5%. In embodiments, the molecular weight of the 95% pre-SOF molecules is less than 5,000 daltons, such as 2,500 daltons, or 1,000 daltons. The preparation of pre-SOFs may be used to increase the loading of the molecular building blocks in the reaction mixture.

In the case of pre-SOF formation via functional group activation, the molar percentage of functional groups that are activated may be less than 50%, such as about 30% to about 10%, or about 10% to about 5%.

In embodiments, the two methods of pre-SOF formation (pre-SOF formation by the reaction between molecular building blocks or pre-SOF formation by the 'activation' of molecular building block functional groups) may occur in combination and the molecular building blocks incorporated into pre-SOF structures may contain activated functional groups. In embodiments, pre-SOF formation by the reaction between molecular building blocks and pre-SOF formation by the 'activation' of molecular building block functional groups may occur simultaneously.

In embodiments, the duration of pre-SOF formation lasts about 10 seconds to about 48 hours, such as about 30 seconds to about 12 hours, or about 1 minute to 6 hours.

In particular embodiments, the reaction mixture needs to have a viscosity that will support the deposited wet layer. Reaction mixture viscosities range from about 10 to about 50,000 cps, such as from about 25 to about 25,000 cps or from about 50 to about 1000 cps.

The molecular building block and capping unit loading or "loading" in the reaction mixture is defined as the total weight of the molecular building blocks and optionally the capping units and catalysts divided by the total weight of the reaction mixture. Building block loadings may range from about 3 to 100%, such as from about 5 to about 50%, or from about 15 to about 40%. In the case where a liquid molecular building block is used as the only liquid component of the reaction mixture (i.e. no additional liquid is used), the building block loading would be about 100%. The capping unit loading may be chosen, so as to achieve the desired loading of the capping group. For example, depending on when the capping unit is to be added to the reaction mixture, capping unit loadings may range, by weight, from about 3 to 80%, such as from about 5 to about 50%, or from about 15 to about 40% by weight.

In embodiments, the theoretical upper limit for capping unit loading is the molar amount of capping units that reduces the number of available linking groups to 2 per molecular building block in the liquid SOF formulation. In such a loading, substantial SOF formation may be effectively inhibited by exhausting (by reaction with the respective capping group) the number of available linkable functional groups per molecular building block. For example, in such a situation (where the capping unit loading is in an amount sufficient to ensure that the molar excess of available linking groups is less than 2 per molecular building block in the liquid SOF formulation), oligomers, linear polymers, and molecular building blocks that are fully capped with capping units may predominately form instead of an SOF.

In embodiments, the pre-SOF may be made from building blocks with one or more of the added functionality selected from the group consisting of hydrophobic added functionality, superhydrophobic added functionality, hydrophilic added functionality, superhydrophilic added functionality, lipophobic added functionality, superlipophobic added functionality, lipophilic added functionality, photochromic added functionality, and electroactive added functionality. In embodiments, the inclined property of the molecular building blocks is the same as the added functionality of the pre-SOF. In embodiments, the added functionality of the SOF is not an inclined property of the molecular building blocks.

Liquids used in the reaction mixture may be pure liquids, such as solvents, and/or solvent mixtures. Liquids are used to dissolve or suspend the molecular building blocks and catalyst/modifiers in the reaction mixture. Liquid selection is generally based on balancing the solubility/dispersion of the molecular building blocks and a particular building block loading, the viscosity of the reaction mixture, and the boiling point of the liquid, which impacts the promotion of the wet layer to the dry SOF. Suitable liquids may have boiling points from about 30 to about 300° C., such as from about 65° C. to about 250° C., or from about 100° C. to about 180° C.

Liquids may include molecule classes such as alkanes (hexane, heptane, octane, nonane, decane, cyclohexane, cycloheptane, cyclooctane, decalin); mixed alkanes (hexanes, heptanes); branched alkanes (isooctane); aromatic compounds (toluene, o-, m-, p-xylene, mesitylene, nitrobenzene, benzonitrile, butylbenzene, aniline); ethers (benzyl ethyl ether, butyl ether, isoamyl ether, propyl ether); cyclic ethers (tetrahydrofuran, dioxane), esters (ethyl acetate, butyl acetate, butyl butyrate, ethoxyethyl acetate, ethyl propionate, phenyl acetate, methyl benzoate); ketones (acetone, methyl ethyl ketone, methyl isobutylketone, diethyl ketone, chloroacetone, 2-heptanone), cyclic ketones (cyclopentanone, cyclohexanone), amines (1°, 2°, or 3° amines such as butylamine, diisopropylamine, triethylamine, diisoproylethylamine; pyridine); amides (dimethylformamide, N-methylpyrrolidinone, N,N-dimethylformamide); alcohols (methanol, ethanol, n-, propanol, n-, i-, t-butanol, 1-methoxy-2-propanol, hexanol, cyclohexanol, 3-pentanol, benzyl alcohol); nitriles (acetonitrile, benzonitrile, butyronitrile), halogenated aromatics (chlorobenzene, dichlorobenzene, hexafluorobenzene), halogenated alkanes (dichloromethane, chloroform, dichloroethylene, tetrachloroethane); and water.

Mixed liquids comprising a first solvent, second solvent, third solvent, and so forth may also be used in the reaction mixture. Two or more liquids may be used to aid the dissolution/dispersion of the molecular building blocks; and/or increase the molecular building block loading; and/or allow a stable wet film to be deposited by aiding the wetting of the substrate and deposition instrument; and/or modulate the promotion of the wet layer to the dry SOF. In embodiments, the second solvent is a solvent whose boiling point or vapor-pressure curve or affinity for the molecular building blocks differs from that of the first solvent. In embodiments, a first solvent has a boiling point higher than that of the second solvent. In embodiments, the second solvent has a boiling point equal to or less than about 100° C., such as in the range of from about 30° C. to about 100° C., or in the range of from about 40° C. to about 90° C., or about 50° C. to about 80° C.

In embodiments, the first solvent, or higher boiling point solvent, has a boiling point equal to or greater than about 65° C., such as in the range of from about 80° C. to about 300° C., or in the range of from about 100° C. to about 250° C., or about 100° C. to about 180° C. The higher boiling point solvent may include, for example, the following (the value in parentheses is the boiling point of the compound): hydrocarbon solvents such as amylbenzene (202° C.), isopropylbenzene (152° C.), 1,2-diethylbenzene (183° C.), 1,3-diethylbenzene (181° C.), 1,4-diethylbenzene (184° C.), cyclohexylbenzene (239° C.), dipentene (177° C.), 2,6-dimethylnaphthalene (262° C.), p-cymene (177° C.), camphor oil (160-185° C.), solvent naphtha (110-200° C.), cis-decalin (196° C.), trans-decalin (187° C.), decane (174° C.), tetralin (207° C.), turpentine oil (153-175° C.), kerosene (200-245° C.), dodecane (216° C.), dodecylbenzene (branched), and so forth; ketone and aldehyde solvents such as acetophenone (201.7° C.), isophorone (215.3° C.), phorone (198-199° C.), methylcyclohexanone (169.0-170.5° C.), methyl n-heptyl ketone (195.3° C.), and so forth; ester solvents such as diethyl phthalate (296.1° C.), benzyl acetate (215.5° C.), γ-butyrolactone (204° C.), dibutyl oxalate (240° C.), 2-ethylhexyl acetate (198.6° C.), ethyl benzoate (213.2° C.), benzyl formate (203° C.), and so forth; diethyl sulfate (208° C.), sulfolane (285° C.), and halohydrocarbon solvents; etherified hydrocarbon solvents; alcohol solvents; ether/acetal solvents; polyhydric alcohol solvents; carboxylic anhydride solvents; phenolic solvents; water; and silicone solvents.

The ratio of the mixed liquids may be established by one skilled in the art. The ratio of liquids a binary mixed liquid may be from about 1:1 to about 99:1, such as from about 1:10 to about 10:1, or about 1:5 to about 5:1, by volume. When n liquids are used, with n ranging from about 3 to about 6, the amount of each liquid ranges from about 1% to about 95% such that the sum of each liquid contribution equals 100%.

In embodiments, the mixed liquid comprises at least a first and a second solvent with different boiling points. In further embodiments, the difference in boiling point between the first and the second solvent may be from about nil to about 150° C., such as from nil to about 50° C. For example, the boiling point of the first solvent may exceed the boiling point of the second solvent by about 1° C. to about 100° C., such as by about 5° C. to about 100° C., or by about 10° C. to about 50° C. The mixed liquid may comprise at least a first and a second solvent with different vapor pressures, such as combinations of high vapor pressure solvents and/or low vapor pressure solvents. The term "high vapor pressure solvent" refers to, for example, a solvent having a vapor pressure of at least about 1 kPa, such as about 2 kPa, or about kPa. The term "low vapor pressure solvent" refers to, for example, a solvent having a vapor pressure of less than about 1 kPa, such as about 0.9 kPa, or about 0.5 kPa. In embodiments, the first solvent may be a low vapor pressure solvent such as, for example, terpineol, diethylene glycol, ethylene glycol, hexylene glycol, N-methyl-2-pyrrolidone, and tri(ethylene glycol) dimethyl ether. A high vapor pressure solvent allows rapid removal of the solvent by drying and/or evaporation at temperatures below the boiling point. High vapor pressure solvents may include, for example, acetone, tetrahydrofuran, toluene, xylene, ethanol, methanol, 2-butanone and water.

In embodiments where mixed liquids comprising a first solvent, second solvent, third solvent, and so forth are used in the reaction mixture, promoting the change of the wet film and forming the dry SOF may comprise, for example, heating the wet film to a temperature above the boiling point of the reaction mixture to form the dry SOF film; or heating the wet film to a temperature above the boiling point of the second solvent (below the temperature of the boiling point of the first solvent) in order to remove the second solvent while substantially leaving the first solvent and then after substantially removing the second solvent, removing the first solvent by heating the resulting composition at a temperature either above or below the boiling point of the first solvent to form the dry SOF film; or heating the wet film below the boiling point of the second solvent in order to remove the second solvent (which is a high vapor pressure solvent) while substantially leaving the first solvent and, after removing the second solvent, removing the first solvent by heating the resulting composition at a temperature either above or below the boiling point of the first solvent to form the dry SOF film.

The term "substantially removing" refers to, for example, the removal of at least 90% of the respective solvent, such as about 95% of the respective solvent. The term "substantially leaving" refers to, for example, the removal of no more than 2% of the respective solvent, such as removal of no more than 1% of the respective solvent.

These mixed liquids may be used to slow or speed up the rate of conversion of the wet layer to the SOF in order to manipulate the characteristics of the SOFs. For example, in condensation and addition/elimination linking chemistries, liquids such as water, 1°, 2°, or 3° alcohols (such as methanol, ethanol, propanol, isopropanol, butanol, 1-methoxy-2-propanol, tert-butanol) may be used.

Optionally a catalyst may be present in the reaction mixture to assist the promotion of the wet layer to the dry SOF. Selection and use of the optional catalyst depends on the functional groups on the molecular building blocks. Catalysts may be homogeneous (dissolved) or heterogeneous (undissolved or partially dissolved) and include Brönsted acids (HCl (aq), acetic acid, p-toluenesulfonic acid, amine-protected p-toluenesulfonic acid such as pyrridium p-toluenesulfonate, trifluoroacetic acid); Lewis acids (boron trifluoroetherate, aluminum trichloride); Brönsted bases (metal hydroxides such as sodium hydroxide, lithium hydroxide, potassium hydroxide; 1°, 2°, or 3° amines such as butylamine, diisopropylamine, triethylamine, diisoproylethylamine); Lewis bases (N,N-dimethyl-4-aminopyridine); metals (Cu bronze); metal salts ($FeCl_3$, $AuCl_3$); and metal complexes (ligated palladium complexes, ligated ruthenium catalysts). Typical catalyst loading ranges from about 0.01% to about 25%, such as from about 0.1% to about 5% of the molecular building block loading in the reaction mixture. The catalyst may or may not be present in the final SOF composition.

Optionally additives or secondary components, such as dopants, may be present in the reaction mixture and wet layer. Such additives or secondary components may also be integrated into a dry SOF. Additives or secondary components can be homogeneous or heterogeneous in the reaction mixture and wet layer or in a dry SOF. The terms "additive" or "secondary component," refer, for example, to atoms or molecules that are not covalently bound in the SOF, but are randomly distributed in the composition. In embodiments, secondary components such as conventional additives may be used to take advantage of the known properties associated with such conventional additives. Such additives may be used to alter the physical properties of the SOF such as electrical properties (conductivity, semiconductivity, electron transport, hole transport), surface energy (hydrophobicity, hydrophilicity), tensile strength, and thermal conductivity; such additives may include impact modifiers, reinforcing fibers, lubricants, antistatic agents, coupling agents, wetting agents, antifogging agents, flame retardants, ultraviolet stabilizers, antioxidants, biocides, dyes, pigments, odorants, deodorants, nucleating agents and the like.

In embodiments, the SOF may contain antioxidants as a secondary component to protect the SOF from oxidation. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4- hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10) 4-bromo-2,6-dimethylphenol (Aldrich 34, 951-8), (11) 4-bromo-3,5-didimethylphenol (Aldrich B6,420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis (hydroxymethyl)-p-cresol (Aldrich 22, 752-8), (17) 2,2'-methylenediphenol (Aldrich B4,680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7), (21) α trifluoro-o-cresol (Aldrich 21, 979-7), (22) 2-bromo-4-fluorophenol (Aldrich 30, 246-5), (23) 4-fluorophenol (Aldrich F1,320-7), (24) 4-chlorophenyl-2-chloro-1,1,2-tri-fluoroethyl sulfone (Aldrich 13, 823-1), (25) 3,4-difluoro phenylacetic acid (Aldrich 29, 043-2), (26) 3-fluorophenylacetic acid (Aldrich 24, 804-5), (27) 3,5-difluoro phenylacetic acid (Aldrich 29, 044-0), (28) 2-fluorophenylacetic acid (Aldrich 20, 894-9), (29) 2,5-bis (trifluoromethyl)benzoic acid (Aldrich 32, 527-9), (30) ethyl-2-(4-(4-(trifluoromethyl)phenoxy)phenoxy) propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43, 071-4), NAUGARD 76, NAUGARD 445, NAUGARD 512, and NAUGARD 524 (manufactured by Uniroyal Chemical Company), and the like, as well as mixtures thereof. The antioxidant, when present, may be present in the SOF composite in any desired or effective amount, such as from about 0.25 percent to about 10 percent by weight of the SOF or from about 1 percent to about 5 percent by weight of the SOF.

In embodiments, the SOF may further comprise any suitable polymeric material known in the art as a secondary component, such as polycarbonates, acrylate polymers, vinyl polymers, cellulose polymers, polyesters, polysiloxanes, polyamides, polyurethanes, polystyrenes, polystyrene, polyolefins, fluorinated hydrocarbons (fluorocarbons), and engineered resins as well as block, random or alternating copolymers thereof. The SOF composite may comprise homopolymers, higher order polymers, or mixtures thereof, and may comprise one species of polymeric material or mixtures of multiple species of polymeric material, such as mixtures of two, three, four, five or more multiple species of polymeric material. In embodiments, suitable examples of the about polymers include, for example, crystalline and amorphous polymers, or a mixtures thereof. In embodiments, the polymer is a fluoroelastomer.

Suitable fluoroelastomers are those described in detail in U.S. Pat. Nos. 5,166,031, 5,281,506, 5,366,772, 5,370,931, 4,257,699, 5,017,432 and 5,061,965, the disclosures each of which are incorporated by reference herein in their entirety. The amount of fluoroelastomer compound present in the SOF, in weight percent total solids, is from about 1 to about 50 percent, or from about 2 to about 10 percent by weight of the SOF. Total solids, as used herein, includes the amount of secondary components and SOF.

In embodiments, examples of styrene-based monomer and acrylate-based monomers include, for example, poly(styrene-alkyl acrylate), polystyrene-1,3-diene), poly(styrene-alkyl methacrylate), polystyrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and other similar polymers.

Further examples of the various polymers that are suitable for use as a secondary component in SOFs include polyethylene terephthalate, polybutadienes, polysulfones, polyarylethers, polyarylsulfones, polyethersulfones, polycarbonates, polyethylenes, polypropylenes, polydecene, polydodecene, polytetradecene, polyhexadecene, polyoctadene, and polycyclodecene, polyolefin copolymers, mixtures of polyolefins, functional polyolefins, acidic polyolefins, branched polyolefins, polymethylpentenes, polyphenylene sulfides, polyvinyl acetates, polyvinylbutyrals, polysiloxanes, polyacrylates, polyvinyl acetals, polyamides, polyimides, polystyrene and acrylonitrile copolymers, polyvinylchlorides, polyvinyl alcohols, poly-N-vinylpyrrolidinone)s, vinylchloride and vinyl acetate copolymers, acrylate copolymers, poly(amideimide), styrene-butadiene copolymers, vinylidenechloride-vinylchloride copolymers, vinylacetate-vinylidenechloride copolymers, polyvinylcarbazoles, polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (Rohm & Hass), POLYLITE™ (Reichhold Chemical Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like.

In embodiments, the secondary components, including polymers may be distributed homogeneously, or heterogeneously, such as in a linear or nonlinear gradient in the SOF. In embodiments, the polymers may be incorporated into the SOF in the form of a fiber, or a particle whose size may range from about 50 nm to about 2 mm. The polymers, when present, may be present in the SOF composite in any desired or effective amount, such as from about 1 percent to about 50 percent by weight of the SOF or from about 1 percent to about 15 percent by weight of the SOF.

In embodiments, the SOF may further comprise carbon nanotubes or nanofiber aggregates, which are microscopic particulate structures of nanotubes, as described in U.S. Pat. Nos. 5,165,909; 5,456,897; 5,707,916; 5,877,110; 5,110,693; 5,500,200 and 5,569,635, all of which are hereby entirely incorporated by reference.

In embodiments, the SOF may further comprise metal particles as a secondary component; such metal particles include noble and non-noble metals and their alloys. Examples of suitable noble metals include, aluminum, titanium, gold, silver, platinum, palladium and their alloys. Examples of suitable non-noble metals include, copper, nickel, cobalt, lead, iron, bismuth, zinc, ruthenium, rhodium, rubidium, indium, and their alloys. The size of the metal particles may range from about 1 nm to 1 mm and their surfaces may be modified by stabilizing molecules or dispersant molecules or the like. The metal particles, when present, may be present in the SOF composite in any desired or effective amount, such as from about 0.25 percent to about 70 percent by weight of the SOF or from about 1 percent to about 15 percent by weight of the SOF.

In embodiments, the SOF may further comprise oxides and sulfides as secondary components. Examples of suitable metal oxides include, titanium dioxide (titania, rutile and related polymorphs), aluminum oxide including alumina, hydradated alumina, and the like, silicon oxide including silica, quartz, cristobalite, and the like, aluminosilicates including zeolites, talcs, and clays, nickel oxide, iron oxide, cobalt oxide. Other examples of oxides include glasses, such as silica glass, borosilicate glass, aluminosilicate glass and the like. Examples of suitable sulfides include nickel sulfide, lead sulfide, cadmium sulfide, tin sulfide, and cobalt sulfide. The diameter of the oxide and sulfide materials may range from about 50 nm to 1 mm and their surfaces may be modified by stabilizing molecules or dispersant molecules or the like. The oxides, when present, may be present in the SOF composite in any desired or effective amount, such as from about 0.25 percent to about 20 percent by weight of the SOF or from about 1 percent to about 15 percent by weight of the SOF.

In embodiments, the SOF may further comprise metalloid or metal-like elements from the periodic table. Examples of suitable metalloid elements include, silicon, selenium, tellurium, tin, lead, germanium, gallium, arsenic, antimony and their alloys or intermetallics. The size of the metal particles may range from about 10 nm to 1 mm and their surfaces may be modified by stabilizing molecules or dispersant molecules or the like. The metalloid particles, when present, may be present in the SOF composite in any desired or effective amount, such as from about 0.25 percent to about 10 percent by weight of the SOF or from about 1 percent to about 5 percent by weight of the SOF.

In embodiments, the SOF may further comprise hole transport molecules or electron acceptors as a secondary component, such charge transport molecules include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methylpyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly (vinylpyrene); poly(vinyltetraphene); poly(vinyltetracene) and poly(vinylperylene). Suitable electron transport materials include electron acceptors such as 2,4,7-trinitro-9-fluorenone; 2,4,5,7-tetranitro-fluorenone; dinitroanthracene; dinitroacridene; tetracyanopyrene; dinitroanthraquinone; and butylcarbonylfluorenemalononitrile, see U.S. Pat. No. 4,921,769 the disclosure of which is incorporated herein by reference in its entirety. Other hole transporting materials include arylamines described in U.S. Pat. No. 4,265,990 the disclosure of which is incorporated herein by reference in its entirety, such as N,N'-diphenyl-N,N'-bis(alkylphenyl)-(1,1'-biphenyl)-4,4'-diamine wherein alkyl is selected from the group consisting of methyl, ethyl, propyl, butyl, hexyl, and the like. Hole transport molecules of the type described in, for example, U.S. Pat. Nos. 4,306,008; 4,304,829; 4,233,384; 4,115,116; 4,299,897; 4,081,274, and 5,139,910, the entire disclosures of each are incorporated herein by reference. Other known charge transport layer molecules may be selected, reference for example U.S. Pat. Nos. 4,921,773 and 4,464,450 the disclosures of which are incorporated herein by reference in their entireties. The hole transport molecules or electron acceptors, when present, may be present in the SOF composite in any desired or effective amount, such as from about 0.25 percent to about 50 percent by weight of the SOF or from about 1 percent to about 20 percent by weight of the SOF.

In embodiments, the SOF may further comprise biocides as a secondary component. Biocides may be present in amounts of from about 0.1 to about 1.0 percent by weight of the SOF. Suitable biocides include, for example, sorbic acid, 1-(3-chloroallyl)-3,5,7-triaza-1-azoniaadamantane chloride, commercially available as DOWICIL 200 (Dow Chemical Company), vinylene-bis thiocyanate, commercially available as CYTOX 3711 (American Cyanamid Company), disodium ethylenebis-dithiocarbamate, commercially available as DITHONE D14 (Rohm & Haas Company), bis(trichloromethyl)sulfone, commercially available as BIOCIDE N-1386 (Stauffer Chemical Company), zinc pyridinethione, commercially available as zinc omadine (Olin Corporation), 2-bromo-t-nitropropane-1,3-diol, commercially available as ONYXIDE 500 (Onyx Chemical Company), BOSQUAT MB50 (Louza, Inc.), and the like.

In embodiments, the SOF may further comprise small organic molecules as a secondary component; such small organic molecules include those discussed above with respect to the first and second solvents. The small organic molecules, when present, may be present in the SOF in any desired or effective amount, such as from about 0.25 percent to about 50 percent by weight of the SOF or from about 1 percent to about 10 percent by weight of the SOF.

When present, the secondary components or additives may each, or in combination, be present in the composition in any desired or effective amount, such as from about 1 percent to about 50 percent by weight of the composition or from about 1 percent to about 20 percent by weight of the composition.

SOFs may be modified with secondary components (dopants and additives, such as, hole transport molecules (mTBD), polymers (polystyrene), nanoparticles (C60 Buckminster fullerene), small organic molecules (biphenyl), metal particles (copper micropowder), electron acceptors (quinone), and fluorinated particles (polytetrafluoroethylene, PTFE)) to give composite structured organic films. Secondary components may be introduced to the liquid formulation that is used to generate a wet film in which a change is promoted to form the SOF. Secondary components (dopants, additives, etc.) may either be dissolved or undissolved (suspended) in the reaction mixture. Secondary components are not bonded into the network of the film. For example, a secondary component may be added to a reaction mixture that contains a plurality of building blocks having four methoxy groups (—OMe) on a segment, such as N4,N4,N4',N4'-tetra-p-tolylbiphenyl-4,4'-diamine, which upon promotion of a change in the wet film, exclusively react with the two alcohol (—OH) groups on a building block, such as 1,4-benzenedimethanol, which contains a p-xylyl segment. The chemistry that is occurring to link building blocks is an acid catalyzed transetherfication reaction. Because —OH groups will only react with —OMe groups (and vice versa) and not with the secondary component, these molecular building blocks can only follow one pathway. Therefore, the SOF is programmed to order molecules in a way that leaves the secondary component incorporated within and/or around the SOF structure. This ability to pattern molecules and incorporate secondary components affords superior performance and unprecedented control over properties compared to conventional polymers and available alternatives.

Optionally additives or secondary components, such as dopants, may be present in the reaction mixture and wet layer. Such additives or secondary components may also be integrated into a dry SOF. Additives or secondary components can be homogeneous or heterogeneous in the reaction mixture and wet layer or in a dry SOF. In contrast to capping units, the terms "additive" or "secondary component," refer, for example, to atoms or molecules that are not covalently bound in the SOF, but are randomly distributed in the composition. Suitable secondary components and additives are described in U.S. patent application Ser. No. 12/716,324, entitled "Composite Structured Organic Films," the disclosure of which is totally incorporated herein by reference in its entirety.

In embodiments, the secondary components may have similar or disparate properties to accentuate or hybridize (synergistic effects or ameliorative effects as well as the ability to attenuate inherent or inclined properties of the capped SOF) the intended property of the capped SOF to enable it to meet performance targets. For example, doping the capped SOFs with antioxidant compounds will extend the life of the capped SOF by preventing chemical degradation pathways. Additionally, additives maybe added to improve the morphological properties of the capped SOF by tuning the reaction occurring during the promotion of the change of the reaction mixture to fowl the capped SOF.

Process Action B: Depositing the Reaction Mixture as a Wet Film

The reaction mixture may be applied as a wet film to a variety of substrates, such as print head front faces, using a number of liquid deposition techniques. The thickness of the SOF is dependant on the thickness of the wet film and the molecular building block loading in the reaction mixture. The thickness of the wet film is dependent on the viscosity of the reaction mixture and the method used to deposit the reaction mixture as a wet film.

Substrates include, for example, polymers, papers, metals and metal alloys, doped and undoped forms of elements from Groups III-VI of the periodic table, metal oxides, metal chalcogenides, and previously prepared SOFs or capped SOFs. Examples of polymer film substrates include polyesters, polyolefins, polycarbonates, polystyrenes, polyvinylchloride, block and random copolymers thereof, and the like. Examples of metallic surfaces include metallized polymers, metal foils, metal plates; mixed material substrates such as metals patterned or deposited on polymer, semiconductor, metal oxide, or glass substrates. Examples of substrates comprised of doped and undoped elements from Groups III-VI of the periodic table include, aluminum, silicon, silicon n-doped with phosphorous, silicon p-doped with boron, tin, gallium arsenide, lead, gallium indium phosphide, and indium. Examples of metal oxides include silicon dioxide, titanium dioxide, indium tin oxide, tin dioxide, selenium dioxide, and alumina. Examples of metal chalcogenides include cadmium sulfide, cadmium telluride, and zinc selenide. Additionally, it is appreciated that chemically treated or mechanically modified forms of the above substrates remain within the scope of surfaces that may be coated with the reaction mixture.

In embodiments, the substrate may be composed of, for example, silicon, glass plate, plastic film or sheet. For structurally flexible devices, a plastic substrate such as polyester, polycarbonate, polyimide sheets and the like may be used. The thickness of the substrate may be from around 10 micrometers to over 10 millimeters with an exemplary thickness being from about 50 to about 100 micrometers, especially for a flexible plastic substrate, and from about 1 to about 10 millimeters for a rigid substrate such as glass or silicon.

The reaction mixture may be applied to the substrate using a number of liquid deposition techniques including, for example, spin coating, blade coating, web coating, dip coating, cup coating, rod coating, screen printing, ink jet printing, spray coating, stamping and the like. The method used to deposit the wet layer depends on the nature, size, and shape of the substrate and the desired wet layer thickness. The thickness of the wet layer can range from about 10 nm to about 5 mm, such as from about 100 nm to about 1 mm, or from about 1 µm to about 500 µm.

In embodiments, the capping unit and/or secondary component may be introduced following completion of the above described process action B. The incorporation of the capping unit and/or secondary component in this way may be accomplished by any means that serves to distribute the capping unit and/or secondary component homogeneously, heterogeneously, or as a specific pattern over the wet film. Following introduction of the capping unit and/or secondary component subsequent process actions may be carried out resuming with process action C.

For example, following completion of process action B (i.e., after the reaction mixture may be applied to the substrate), capping unit(s) and/or secondary components (dopants, additives, etc.) may be added to the wet layer by any suitable method, such as by distributing (e.g., dusting, spraying, pouring, sprinkling, etc, depending on whether the capping unit and/or secondary component is a particle, powder or liquid) the capping unit(s) and/or secondary component on the top the wet layer. The capping units and/or secondary components may be applied to the formed wet layer in a homogeneous or heterogeneous manner, including various patterns, wherein the concentration or density of the capping unit(s) and/or secondary component is reduced in specific areas, such as to form a pattern of alternating bands of high and low concentrations of the capping unit(s) and/or secondary component of a given width on the wet layer. In embodiments, the application of the capping unit(s) and/or secondary component to the top of the wet layer may result in a portion of the capping unit(s) and/or secondary component diffusing or sinking into the wet layer and thereby forming a heterogeneous distribution of capping unit(s) and/or secondary component within the thickness of the SOF, such that a linear or nonlinear concentration gradient may be obtained in the resulting SOF obtained after promotion of the change of the wet layer to a dry SOF. In embodiments, a capping unit(s) and/or secondary component may be added to the top surface of a deposited wet layer, which upon promotion of a change in the wet film, results in an SOF having an heterogeneous distribution of the capping unit(s) and/or secondary component in the dry SOF. Depending on the density of the wet film and the density of the capping unit(s) and/or secondary component, a majority of the capping unit(s) and/or secondary component may end up in the upper half (which is opposite the substrate) of the dry SOF or a majority of the capping unit(s) and/or secondary component may end up in the lower half (which is adjacent to the substrate) of the dry SOF.

Process Action C: Promoting the Change of Wet Film to the Dry SOF

The term "promoting" refers, for example, to any suitable technique to facilitate a reaction of the molecular building blocks and/or pre-SOFs, such as a chemical reaction of the functional groups of the building blocks and/or pre-SOFs. In the case where a liquid needs to be removed to form the dry film, "promoting" also refers to removal of the liquid. Reaction of the molecular building blocks and/or pre-SOFs and removal of the liquid can occur sequentially or concurrently. In certain embodiments, the liquid is also one of the molecular building blocks and is incorporated into the SOF. The term "dry SOF" refers, for example, to substantially dry SOFs, for example, to a liquid content less than about 5% by weight of the SOF, or to a liquid content less than 2% by weight of the SOF.

In embodiments, the dry SOF or a given region of the dry SOF (such as the surface to a depth equal to of about 10% of the thickness of the SOF or a depth equal to of about 5% of the thickness of the SOF, the upper quarter of the SOF, or the regions discussed above) has a molar ratio of capping units to segments of from about 1:100 to about 1:1, such as from about 1:50 to about 1:2, or from about 1:20 to 1:4.

In embodiments, the fluorine content of the fluorinated dry SOF may be of from about 5% to about 75% by weight, such as about 5% to about 65% by weight, or about 10% to about 50% by weight. In embodiments, the fluorine content of the fluorinated dry SOF is not less than about 10% by weight, such as not less than 40% by weight, or not less than 50% by weight, and an upper limit of the fluorine content is about 75% by weight, or about 60% by weight.

Promoting the wet layer to form a dry SOF may be accomplished by any suitable technique. Promoting the wet layer to form a dry SOF typically involves thermal treatment including, for example, oven drying, infrared radiation (IR), and the like with temperatures ranging from 40 to 350° C. and from 60 to 200° C. and from 85 to 160° C. The total heating time can range from about four seconds to about 24 hours, such as from one minute to 120 minutes, or from three minutes to 60 minutes.

In embodiments where a secondary component is present, the molecular size of the secondary component may be selected such that during the promotion of the wet layer to form a dry SOF the secondary component is trapped within the framework of the SOF such that the trapped secondary component will not leach from the SOF during exposure to a liquid toner or solvent.

IR promotion of the wet layer to the COF film may be achieved using an IR heater module mounted over a belt transport system. Various types of IR emitters may be used, such as carbon IR emitters or short wave IR emitters (available from Heraerus). Additional exemplary information regarding carbon IR emitters or short wave IR emitters is summarized in the following Table (Table 1).

TABLE 1

Information regarding carbon IR emitters or short wave IR emitters

| IR lamp | Peak Wavelength | Number of lamps | Module Power (kW) |
|---|---|---|---|
| Carbon | 2.0 micron | 2 - twin tube | 4.6 |
| Short wave | 1.2-1.4 micron | 3 - twin tube | 4.5 |

Process Action D: Optionally Removing the SOF from the Coating Substrate to Obtain a Free-Standing SOF In embodiments, a free-standing SOF is desired. Free-standing SOFs may be obtained when an appropriate low adhesion substrate is used to support the deposition of the wet layer. Appropriate substrates that have low adhesion to the SOF may include, for example, metal foils, metalized polymer substrates, release papers and SOFs, such as SOFs prepared with a surface that has been altered to have a low adhesion or a decreased propensity for adhesion or attachment. Removal of the SOF from the supporting substrate may be achieved in a number of ways by someone skilled in the art. For example, removal of the SOF from the substrate may occur by starting from a corner or edge of the film and optionally assisted by passing the substrate and SOF over a curved surface.

Process Action E: Optionally Processing the Free-Standing SOF into a Roll

Optionally, a free-standing SOF or a SOF supported by a flexible substrate may be processed into a roll. The SOF may be processed into a roll for storage, handling, and a variety of other purposes. The starting curvature of the roll is selected such that the SOF is not distorted or cracked during the rolling process.

Process Action F: Optionally Cutting and Seaming the SOF into a Shape, Such as a Belt The method for cutting and seaming the SOF is similar to that described in U.S. Pat. No. 5,455,136 issued on Oct. $3^{rd}$, 1995 (for polymer films), the disclosure of which is herein totally incorporated by reference. An SOF belt may be fabricated from a single SOF, a multi layer SOF or an SOF sheet cut from a web. Such sheets may be rectangular in shape or any particular shape as desired. All sides of the SOF(s) may be of the same length, or one pair of parallel sides may be longer than the other pair of parallel sides. The SOF(s) may be fabricated into shapes, such as a belt by overlap joining the opposite marginal end regions of the SOF sheet. A seam is typically produced in the overlapping marginal end regions at the point of joining. Joining may be affected by any suitable means. Typical joining techniques include, for example, welding (including ultrasonic), gluing, taping, pressure heat fusing and the like. Methods, such as ultrasonic welding, are desirable general methods of joining flexible sheets because of their speed, cleanliness (no solvents) and production of a thin and narrow seam.

Process Action G: Optionally Using a SOF as a Substrate for Subsequent SOF Formation Processes A SOF may be used as a substrate in the SOF forming process to afford a multi-layered structured organic film. The layers of a multi-layered SOF may be chemically bound in or in physical contact. Chemically bound, multi-layered SOFs are formed when functional groups present on the substrate SOF surface can react with the molecular building blocks present in the deposited wet layer used to form the second structured organic film layer. Multi-layered SOFs in physical contact may not chemically bound to one another.

A SOF substrate may optionally be chemically treated prior to the deposition of the wet layer to enable or promote chemical attachment of a second SOF layer to form a multi-layered structured organic film.

Alternatively, a SOF substrate may optionally be chemically treated prior to the deposition of the wet layer to disable chemical attachment of a second SOF layer (surface pacification) to form a physical contact multi-layered SOF.

Other methods, such as lamination of two or more SOFs, may also be used to prepare physically contacted multi-layered SOFs.

Patterned SOF Composition

An embodiment of the disclosure is to attain a SOF wherein the microscopic arrangement of segments is patterned. The term "patterning" refers, for example, to the sequence in which segments are linked together. A patterned SOF would therefore embody a composition wherein, for example, segment A is only connected to segment B, and conversely, segment B is only connected to segment A. Further, a system wherein only one segment exists, say segment A, is employed is will be patterned because A is intended to only react with A. In principle a patterned SOF may be achieved using any number of segment types. The patterning of segments may be controlled by using molecular building blocks whose functional group reactivity is intended to compliment a partner molecular building block and wherein the likelihood of a molecular building block to react with itself is minimized. The aforementioned strategy to segment patterning is non-limiting. Instances where a specific strategy to control patterning has not been deliberately implemented are also embodied herein.

A patterned film may be detected using spectroscopic techniques that are capable of assessing the successful formation of linking groups in a SOF. Such spectroscopies include, for example, Fourier-transfer infrared spectroscopy, Raman spectroscopy, and solid-state nuclear magnetic resonance spectroscopy. Upon acquiring a data by a spectroscopic technique from a sample, the absence of signals from functional groups on building blocks and the emergence of signals from linking groups indicate the reaction between building blocks and the concomitant patterning and formation of an SOF.

Different degrees of patterning are also embodied. Full patterning of a SOF will be detected by the complete absence of spectroscopic signals from building block functional groups. Also embodied are SOFs having lowered degrees of patterning wherein domains of patterning exist within the SOF. SOFs with domains of patterning, when measured spectroscopically, will produce signals from building block functional groups which remain unmodified at the periphery of a patterned domain.

It is appreciated that a very low degree of patterning is associated with inefficient reaction between building blocks and the inability to form a film. Therefore, successful implementation of the process of the present disclosure requires appreciable patterning between building blocks within the SOF. The degree of necessary patterning to form a SOF is variable and can depend on the chosen building blocks and desired linking groups. The minimum degree of patterning required is that required to form a film using the process described herein, and may be quantified as formation of about 20% or more of the intended linking groups, such as about 40% or more of the intended linking groups or about 50% or more of the intended linking groups; the nominal degree of patterning embodied by the present disclosure is formation of about 60% of the intended linking group, such as formation of about 100% of the intended linking groups. Formation of linking groups may be detected spectroscopically as described earlier in the embodiments.

In the following examples, the testing procedure and surface free energy calculation includes cutting samples into 15 mm×50-145 mm by double blade cutter. Sample thickness should be less than 1.5 mm using standard holder and less than 5.0 mm using homemade special holder. Sample was mounted onto the sample holder with double sides tape. Three testing liquids were used throughout the contact angle measurements, water, formamide and diiodomethane. Around 8 drops were generated depending on the sample availability and the contact angle was measured. The average contact angle for 0.1 s, 1 s and 10 s data were recorded. The surface free energy, acid and base components of the polar surface energy as well as the dispersive component were calculated using Lewis acid-base method.

Lewis acid-base theory is given by the following equation for the solid-liquid interfacial energy.

$$\gamma_j(1+\cos\theta_j) = 2(\gamma_s^{LW}\gamma_j^{LW})^{\frac{1}{2}} + 2(\gamma_s^-\gamma_j^+)^{\frac{1}{2}} + 2(\gamma_s^+\gamma_j^-)^{\frac{1}{2}}$$

where
(LW), (+), (−) are the dispersive, acid and base components of the SFE index; j refers to liquids 1,2,3;
$\theta_j$ is the contact angle of the jth liquid on the substrate;
$\gamma_j$ is the surface tension of liquid j; and
subscript s refers to the solid.

Production of a SOF

EXAMPLE 1

(Action A) Preparation of the liquid containing reaction mixture. The following were combined: the building block octafluoro-1,6-hexanediol [segment octafluoro-1,6-hexyl; Fg=hydroxyl (—OH); (0.43 g, 1.65 mmol)], a second building block N4,N4,N4',N4'-tetrakis(4-(methoxymethyl)phenyl)biphenyl-4,4'-diamine [segment=N4,N4,N4',N4'-tetra-p-tolylbiphenyl-4,4'-diamine; Fg methoxy ether (—OCH$_3$); (0.55 g, 0.82 mmol)], an acid catalyst delivered as 0.05 g of a 20 wt % solution of Nacure XP-357 to yield the liquid containing reaction mixture, a leveling additive delivered as 0.04 g of a 25 wt % solution of Silclean 3700, and 2.96 g of 1-methoxy-2-propanol. The mixture was shaken and heated at 85° C. for 2.5 hours, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 10 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 6-8 microns that could be delaminated from substrate as a single free-standing film. The color of the SOF was amber.

EXAMPLE 2

(Action A) Preparation of the liquid containing reaction mixture. The following were combined: the building block dodecafluoro-1,8-octanediol [segment=dodecafluoro-1,8-octyl; Fg hydroxyl (—OH); (0.51 g, 1.41 mmol)], a second building block N4,N4,N4',N4'-tetrakis(4-(methoxymethyl) phenyl)biphenyl-4,4'-diamine [segment=N4,N4,N4',N4'-tetra-p-tolylbiphenyl-4,4'-diamine; Fg methoxy ether (—OCH$_3$); (0.47 g, 0.71 mmol)], an acid catalyst delivered as 0.05 g of a 20 wt % solution of Nacure XP-357 to yield the liquid containing reaction mixture, a leveling additive delivered as 0.04 g of a 25 wt % solution of Silclean 3700, and 2.96 g of 1-methoxy-2-propanol. The mixture was shaken and heated at 85° C. for 2.5 hours, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 10 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 6-8 microns that could be delaminated from substrate as a single free-standing film. The color of the SOF was amber.

EXAMPLE 3

(Action A) Preparation of the liquid containing reaction mixture. The following were combined: the building block hexadecafluoro-1,10-decanediol [segment=hexadecafluoro-1,10-decyl; Fg=hydroxyl (—OH); (0.57 g, 1.23 mmol)], a second building block N4,N4,N4',N4'-tetrakis(4-(methoxymethyl)phenyl)biphenyl-4,4'-diamine [segment=N4,N4,N4',N4'-tetra-p-tolylbiphenyl-4,4'-diamine; Fg methoxy ether (—OCH$_3$); (0.41 g, 0.62 mmol)], an acid catalyst delivered as 0.05 g of a 20 wt % solution of Nacure XP-357 to yield the liquid containing reaction mixture, a leveling additive delivered as 0.04 g of a 25 wt % solution of Silclean 3700, and 2.96 g of 1-methoxy-2-propanol. The mixture was shaken and heated at 85° C. for 2.5 hours, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 10 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 6-8 micrometers that could be delaminated from substrate as a single free-standing film. The color of the SOF was amber.

EXAMPLE 4

Action A) Preparation of the liquid containing reaction mixture. The following were combined: the building block octafluoro-1,6-hexanediol [segment=octafluoro-1,6-hexyl; Fg=hydroxyl (—OH); (1.98, 7.55 mmol)], a second building block N2,N2,N4,N4,N6,N6-hexakis(methoxymethyl)-1,3,5-triazine-2,4,6-triamine [segment=N2,N2,N4,N4,N6,N6-hexakis(methyl)-1,3,5-triazine-2,4,6-triamine; Fg methoxy (—OMe); (0.99 g, 2.54 mmol)], an acid catalyst delivered as 0.10 g of a 30 wt % solution of p-toluenesulfonic acid to yield the liquid containing reaction mixture, and 6.93 g of 1,4-dioxane. The mixture was shaken and heated at 75° C. for 1 hour, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 4-5 micrometers that could be delaminated from substrate as a single free-standing film. The SOF was transparent.

EXAMPLE 5

Action A) Preparation of the liquid containing reaction mixture. The following were combined: the building block octafluoro-1,6-hexanediol [segment octafluoro-1,6-hexyl; Fg=hydroxyl (—OH); (1.49, 5.68 mmol)], a second building block N2,N2,N4,N4,N6,N6-hexakis(methoxymethyl)-1,3,5-triazine-2,4,6-triamine [segment=block N2,N2,N4,N4,N6,N6-hexakis(methyl)-1,3,5-triazine-2,4,6-triamine; Fg=methoxy (—OMe); (1.48 g, 3.79 mmol)], an acid catalyst delivered as 0.10 g of a 30 wt % solution of p-toluenesulfonic acid to yield the liquid containing reaction mixture, and 6.93 g of 1,4-dioxane. The mixture was shaken and heated at 75° C. for 1 hour, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 10-11 micrometers that could be delaminated from substrate as a single free-standing film. The SOF was transparent.

EXAMPLE 6

Action A) Preparation of the liquid containing reaction mixture. The following were combined: the building block dodecafluoro-1,6-octanediol [segment=dodecafluoro-1,6-octyl; Fg=hydroxyl (—OH); (2.18, 8.32 mmol)], a second building block N2,N2,N4,N4,N6,N6-hexakis(methoxymethyl)-1,3,5-triazine-2,4,6-triamine [segment=block N2,N2,N4,N4,N6,N6-hexakis(methyl)-1,3,5-triazine-2,4,6-triamine; Fg=methoxy (—OMe); (0.79 g, 2.02 mmol)], an acid catalyst delivered as 0.10 g of a 30 wt % solution of p-toluenesulfonic acid to yield the liquid containing reaction mixture, and 6.93 g of 1,4-dioxane. The mixture was shaken and heated at 75° C. for 1 hour, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 4-5 micrometers that could be delaminated from substrate as a single free-standing film. The SOF was transparent.

EXAMPLE 7

Action A) Preparation of the liquid containing reaction mixture. The following were combined: the building block dodecafluoro-1,6-octanediol [segment dodecafluoro-1,6-octyl; Fg=hydroxyl (—OH); (2.18, 8.32 mmol)], a second building block N2,N2,N4,N4,N6,N6-hexakis(methoxymethyl)-1,3,5-triazine-2,4,6-triamine [segment=block N2,N2,N4,N4,N6,N6-hexakis(methyl)-1,3,5-triazine-2,4,6-triamine; Fg=methoxy (—OMe); (0.79 g, 2.02 mmol)], an acid catalyst delivered as 0.10 g of a 30 wt % solution of p-toluenesulfonic acid to yield the liquid containing reaction mixture, and 6.93 g of 1,4-dioxane. The mixture was shaken and heated at 75° C. for 1 hour, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 4-5 micrometers that could be delaminated from substrate as a single free-standing film. The SOF was transparent.

EXAMPLE 8

Action A) Preparation of the liquid containing reaction mixture. The following were combined: the building block dodecafluoro-1,6-octanediol [segment=dodecafluoro-1,6-octyl; Fg=hydroxyl (—OH); (0.80, 2.21 mmol)], a second building block (4,4',4'',4'''-(biphenyl-4,4'-diylbis(azanetriyl)) tetrakis(benzene-4,1-diyl))tetramethanol [segment=block (4,4',4'',4'''-(biphenyl-4,4'-diylbis(azanetriyl))tetrakis(benzene-4,1-diyl))tetramethyl; Fg=hydroxyl (—OH); (0.67 g, 1.10 mmol)], an acid catalyst delivered as 0.08 g of a 20 wt % solution of Nacure XP-357 to yield the liquid containing reaction mixture, a leveling additive delivered as 0.02 g of a 25 wt % solution of Silclean 3700, 6.33 g of 1-methoxy-2-propanol, and 2.11 g of cyclohexanol. The mixture was shaken and heated at 85° C. for 2.5 hours, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 5-6 micrometers that could be delaminated from substrate as a single free-standing film. The color of the SOF was amber.

EXAMPLE 9

Action A) Preparation of the liquid containing reaction mixture. The following were combined: the building block dodecafluoro-1,6-octanediol [segment=dodecafluoro-1,6-octyl; Fg=hydroxyl (—OH); (0.64, 1.77 mmol)], a second building block (4,4',4'',4'''-(biphenyl-4,4'-diylbis(azanetriyl)) tetrakis(benzene-4,1-diyl))tetramethanol [segment=block (4,4',4'',4'''-(biphenyl-4,4'-diylbis(azanetriyl))tetrakis(benzene-4,1-diyl))tetramethyl; Fg=hydroxyl (—OH); (0.54 g, 0.89 mmol)], an acid catalyst delivered as 0.06 g of a 20 wt % solution of Nacure XP-357 to yield the liquid containing reaction mixture, a leveling additive delivered as 0.05 g of a 25 wt % solution of Silclean 3700, 2.10 g of 1-methoxy-2-propanol, and 0.70 g of cyclohexanol. The mixture was shaken and heated at 85° C. for 2.5 hours, and was then filtered through a 0.45 micron PTFE membrane.

(Action B) Deposition of reaction mixture as a wet film. The reaction mixture was applied to the reflective side of a metalized (TiZr) MYLAR™ substrate using a constant velocity draw down coater outfitted with a bird bar having a 20 mil gap.

(Action C) Promotion of the change of the wet film to a dry SOF. The metalized MYLAR™ substrate supporting the wet layer was rapidly transferred to an actively vented oven preheated to 155° C. and left to heat for 40 minutes. These actions provided an SOF having a thickness of 6-8 micrometers that could be delaminated from substrate as a single free-standing film. The color of the SOF was amber.

The SOFs made high quality films when coated on stainless steel and polyimide substrates. The SOFs could be handled, rubbed, and flexed without any damage/delaminating from the substrate.

Table 2 provides further details of fluorinated SOFs that were prepared. In all cases, the films were coated onto Mylar and cured at 155° C. for 40 minutes. Outcomes from the SOF formulations described in Table 2 are detailed in Table 3. Also included in Table 3 are details for a control SOF comprising a molecular building block that does not have any fluorine content.

TABLE 2

Exemplary Fluorinated SOF coating formulations

| Rectangular Building Block | Linear Fluorinated Building Block | Solvent | Catalyst | % wt Fluorine Content |
|---|---|---|---|---|
| 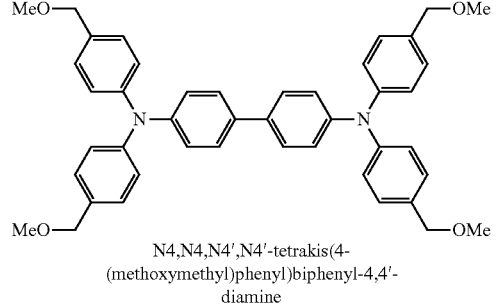<br>N4,N4,N4',N4'-tetrakis(4-(methoxymethyl)phenyl)biphenyl-4,4'-diamine | 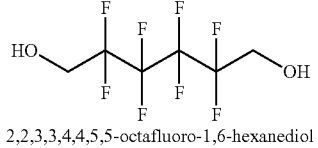<br>2,2,3,3,4,4,5,5-octafluoro-1,6-hexanediol | NMP | Nacure XP357 | 29 |
| Same as above | 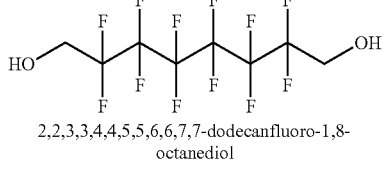<br>2,2,3,3,4,4,5,5,6,6,7,7-dodecanfluoro-1,8-octanediol | NMP | Nacure XP357 | 43 |
| Same as above | 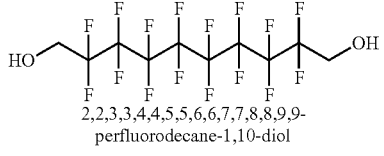<br>2,2,3,3,4,4,5,5,6,6,7,7,8,8,9,9-perfluorodecane-1,10-diol | NMP | Nacure XP-357 | 47 |
| 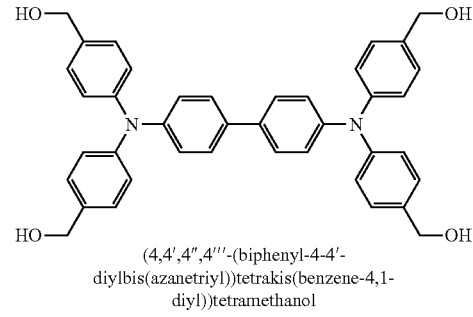<br>(4,4',4'',4'''-(biphenyl-4-4'-diylbis(azanetriyl))tetrakis(benzene-4,1-diyl))tetramethanol | 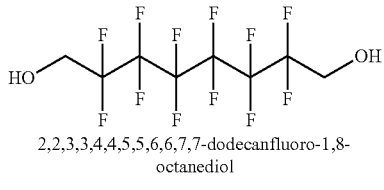<br>2,2,3,3,4,4,5,5,6,6,7,7-dodecanfluoro-1,8-octanediol | 2/1:1-methoxy-2-propanol/cyclohex-anol | Nacure XP-357 | 43 |
| 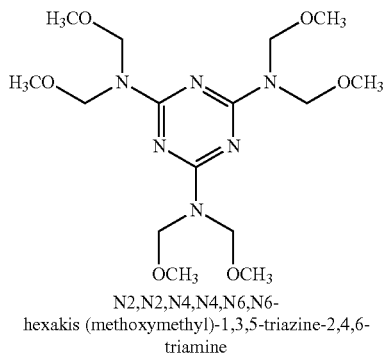<br>N2,N2,N4,N4,N6,N6-hexakis(methoxymethyl)-1,3,5-triazine-2,4,6-triamine | 3 equivalents of<br>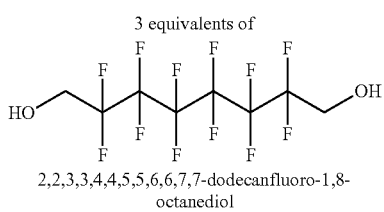<br>2,2,3,3,4,4,5,5,6,6,7,7-dodecanfluoro-1,8-octanediol | 1,4-dioxane | p-toluenesul-fonic acid | 37 |

TABLE 2-continued

Exemplary Fluorinated SOF coating formulations

| Rectangular Building Block | Linear Fluorinated Building Block | Solvent | Catalyst | % wt Fluorine Content |
|---|---|---|---|---|
| Same as above | 6 equivalents of 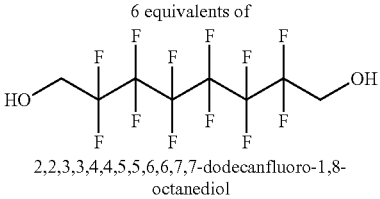<br>2,2,3,3,4,4,5,5,6,6,7,7-dodecanfluoro-1,8-octanediol | 1,4-dioxane | p-toluenesulfonic acid | 50 |
| Same as above | 3 equivalents of 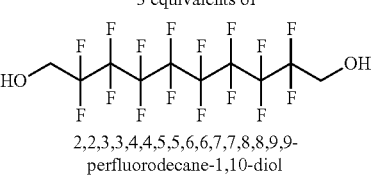<br>2,2,3,3,4,4,5,5,6,6,7,7,8,8,9,9-perfluorodecane-1,10-diol | 1,4-dioxane | p-toluenesulfonic acid | 43 |
| Same as above | 6 equivalents of 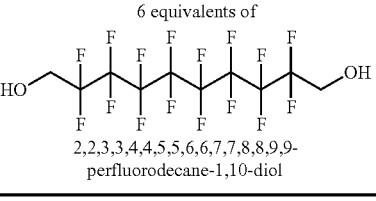<br>2,2,3,3,4,4,5,5,6,6,7,7,8,8,9,9-perfluorodecane-1,10-diol | 1,4-dioxane | p-toluenesulfonic acid | 55 |

Wetting experiments clearly show that fluorinated SOFs exhibit markedly greater water repellency compared to the control SOF, which did not contain any fluorine. Initial water contact angle measurements of fluorinated SOFs were greater than 80°.

It will be appreciated that several of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A fluorinated structured organic film (SOF) comprising a plurality of segments including at least a first segment type and a plurality of linkers including at least a first linker type arranged as a covalent organic framework (COF), wherein at least the first segment type contains fluorine.

2. The SOF of claim 1, wherein the plurality of segments further comprises a second segment type containing fluorine that is different in structure from the first segment type.

3. The SOF of claim 1, wherein from about 30% by weight to about 70% by weight of the segments of the SOF are fluorinated.

4. The SOF of claim 1, wherein the fluorine content of the SOF is from about 5% to about 65% by weight of the SOF.

5. The SOF of claim 1, wherein fluorine distribution is patterned within the SOF.

6. The SOF of claim 1, wherein fluorine is distributed randomly within the SOF.

7. The SOF of claim 1, wherein fluorine is distributed non-uniformly within the thickness of the SOF.

8. The SOF of claim 1, wherein the SOF further comprises a capping unit.

9. The SOF of claim 1, wherein the SOF is a substantially pinhole-free film.

10. The SOF of claim 1, wherein the SOF is a composite SOF.

11. The SOF of claim 1, wherein the SOF has the added functionality of electroactivity.

12. The SOF of claim 1, wherein the first segment type is selected from the group consisting of 2,2,3,3,4,4,5,5-octafluoro-1,6-hexanediol, 2,2,3,3,4,4,5,5,6,6,7,7-dodecanfluoro-1,8-octanediol, 2,2,3,3,4,4,5,5,6,6,7,7,8,8,9,9-perfluorodecane-1,10-diol, (2,3,5,6-Tetrafluoro-4-Hydroxymethyl-Phenyl)-Methanol, 2,2,3,3-Tetrafluoro-1,4-Butanediol, 2,2,3,3,4,4-Hexafluoro-1,5-Pentanediol, 2,2,3,3,4,4,5,5,6,6,7,7,8,8-Tetradecafluoro-1,9-Nonanediol.

13. The SOF of claim 1, wherein the SOF is a defect-free SOF.

14. The SOF of claim 1, wherein the water contact angle on the surface of the SOF is at least 80 degrees.

15. The SOF of claim 1, wherein the presence of fluorine segments modulates the surface energy of the SOF.

16. A process for preparing a fluorinated structured organic film, comprising:
 (a) preparing a liquid-containing reaction mixture comprising:
  a plurality of molecular building blocks including at least a first segment type and a number of functional groups, wherein the first segment type contains fluorine;
 (b) depositing the reaction mixture as a wet film; and
 (c) promoting change of the wet film to form a dry SOF.

17. The process of claim 16, wherein the liquid-containing reaction mixture is a homogeneous solution.

18. The process of claim 16, wherein the fluorine content of the dry SOF is from 5% to 65%.

19. The process of claim 16, wherein from about 30% by weight to about 70% by weight of the segments of the dry SOF are fluorinated.

20. A fluorinated structured organic film (SOF) comprising a plurality of segments including at least a first segment type and a plurality of linkers including at least a first linker type arranged as a covalent organic framework (COF), wherein the framework of the SOF comprises fluorine-containing capping units bonded thereto via linker groups.

* * * * *